(12) United States Patent
Simsek-Ege et al.

(10) Patent No.: US 12,482,519 B2
(45) Date of Patent: Nov. 25, 2025

(54) MICROELECTRONIC DEVICES AND MEMORY DEVICES

(71) Applicant: Micron Technology, Inc., Boise, ID (US)

(72) Inventors: Fatma Arzum Simsek-Ege, Boise, ID (US); Christopher G. Wieduwilt, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 165 days.

(21) Appl. No.: 18/393,416

(22) Filed: Dec. 21, 2023

(65) Prior Publication Data

US 2025/0210101 A1   Jun. 26, 2025

Related U.S. Application Data

(60) Provisional application No. 63/480,623, filed on Jan. 19, 2023.

(51) Int. Cl.
*G11C 7/10* (2006.01)
*G11C 11/4074* (2006.01)
(Continued)

(52) U.S. Cl.
CPC ...... *G11C 11/4096* (2013.01); *G11C 11/4074* (2013.01); *G11C 11/4076* (2013.01); *G11C 11/4087* (2013.01); *H10B 12/50* (2023.02)

(58) Field of Classification Search
CPC ............ G11C 11/4096; G11C 11/4074; G11C 11/4076; G11C 11/4087; H10B 12/50
(Continued)

(56) References Cited

U.S. PATENT DOCUMENTS 6,462,364 B1 * 10/2002 Horiuchi ............ H10D 86/201
257/350
9,432,298 B1 * 8/2016 Smith ................ H04L 49/9057
(Continued)

FOREIGN PATENT DOCUMENTS

KR    10-2008-0018561 A    2/2008

OTHER PUBLICATIONS

International Search Report for International Application No. PCT/US2023/085557, mailed Apr. 29, 2024, 3 pages.
(Continued)

*Primary Examiner* — Viet Q Nguyen
(74) *Attorney, Agent, or Firm* — TraskBritt

(57) ABSTRACT

A microelectronic device comprises a periphery circuitry region, bank regions, a control circuitry structure, and a memory array structure. The periphery circuitry region comprises a central sub-region, and two arm sub-regions extending from the central sub-region from the central sub-region in a first horizontal direction. Each of the two arm sub-regions has a different length than the central sub-region in a second horizontal direction orthogonal to the first horizontal direction. The bank regions are horizontally outward of the periphery circuitry region. The control circuitry structure comprises relatively more speed-critical circuitry within a horizontal area of the periphery circuitry region, and relatively less speed-critical circuitry within horizontal areas of the bank regions. The memory array structure vertically underlies the control circuitry structure and comprises arrays of memory cells within the horizontal areas of the bank regions. Additional microelectronic devices and memory devices are also described.

20 Claims, 10 Drawing Sheets

(51) Int. Cl.
  *G11C 11/4076* (2006.01)
  *G11C 11/408* (2006.01)
  *G11C 11/4096* (2006.01)
  *H10B 12/00* (2023.01)
(58) Field of Classification Search
  USPC .................................................. 365/189.05
  See application file for complete search history.

(56) References Cited

U.S. PATENT DOCUMENTS

| | | | |
|---|---|---|---|
| 10,020,046 | B1 | 7/2018 | Uemura |
| 10,020,252 | B2 | 7/2018 | Miura et al. |
| 10,141,932 | B1 | 11/2018 | Sato |
| 10,224,091 | B1 | 3/2019 | Lee |
| 10,297,307 | B1 | 5/2019 | Raad et al. |
| 10,304,497 | B2 | 5/2019 | Nishizaki |
| 10,304,846 | B2* | 5/2019 | Lupino ............... H10N 70/8845 |
| 10,488,914 | B2 | 11/2019 | Kojima |
| 10,566,036 | B2 | 2/2020 | Kawamura |
| 10,950,299 | B1* | 3/2021 | Mukhanov ............. A61Q 19/00 |
| 11,081,192 | B2* | 8/2021 | Yabe ....................... G11C 16/26 |
| 11,443,971 | B2* | 9/2022 | Or-Bach ................. H10B 41/41 |
| 11,751,383 | B2 | 9/2023 | Simsek-Ege |
| 11,776,925 | B2 | 10/2023 | Simsek-Ege |
| 11,785,764 | B2 | 10/2023 | Simsek-Ege et al. |
| 11,800,725 | B1* | 10/2023 | Or-Bach ................. H10B 80/00 |
| 11,837,594 | B2 | 12/2023 | Simsek-Ege et al. |
| 11,842,990 | B2 | 12/2023 | Parekh et al. |
| 2004/0217776 | A1 | 11/2004 | Horiguchi et al. |
| 2007/0268771 | A1* | 11/2007 | Takemura .............. H10D 89/10<br>365/230.03 |
| 2014/0133259 | A1* | 5/2014 | Perego ................ G06F 11/1048<br>365/230.01 |
| 2022/0012374 | A1 | 1/2022 | Van Leeuwen et al. |
| 2023/0005854 | A1* | 1/2023 | Simsek-Ege ........... H01L 24/08 |
| 2023/0005933 | A1 | 1/2023 | Simsek-Ege |
| 2023/0301053 | A1 | 9/2023 | He et al. |
| 2024/0297169 | A1* | 9/2024 | Or-Bach ................. H01L 25/50 |
| 2025/0126769 | A1* | 4/2025 | Pao ....................... H10D 30/014 |
| 2025/0212525 | A1* | 6/2025 | Wei ........................ H10D 88/00 |

OTHER PUBLICATIONS

International Written Opinion for International Application No. PCT/US2023/085557, mailed Apr. 29, 2024, 4 pages.

He et al., "Microelectronic Devices Including Control Logic Circuitry Overlying Memory Arrays, and Related Memory Devices and Electronic Systems", Filed Aug. 29, 2022, U.S. Appl. No. 17/898,150, 47 pages.

He et al., "Fin Field Effect Transistor Sense Amplifier Circuitry and Related Apparatuses and Computing Systems", Filed Sep. 29, 2022, U.S. Appl. No. 17/936,760, 41 pages.

Simsek-Ege, "Methods of Forming Microelectronic Devices, and Related Microelectronic Devices and Electronic Systems", Filed Sep. 7, 2022, U.S. Appl. No. 17/930,388, 77 pages.

Wieduwilt et al., "Global col. Repair With Local col. Decoder Circuitry, and Related Apparatuses, Methods, and Computing Systems", Filed Oct. 4, 2022, U.S. Appl. No. 17/937,924, 24 pages.

\* cited by examiner

MICROELECTRONIC DEVICES AND MEMORY DEVICES

CROSS-REFERENCE TO RELATED APPLICATION

This application claims the benefit under 35 U.S.C. § 119(e) of U.S. Provisional Patent Application Ser. No. 63/480,623, filed Jan. 19, 2023, the disclosure of which is hereby incorporated herein in its entirety by this reference.

TECHNICAL FIELD

The disclosure, in various embodiments, relates generally to the field of microelectronic device design and fabrication. More specifically, the disclosure relates to microelectronic devices, and to related memory devices and electronic systems.

BACKGROUND

Microelectronic device designers often desire to increase the level of integration or density of features within a microelectronic device by reducing the dimensions of the individual features and by reducing the separation distance between neighboring features. In addition, microelectronic device designers often desire to design architectures that are not only compact, but offer performance advantages, as well as simplified, easier and less expensive to fabricate designs.

One example of a microelectronic device is a memory device. Memory devices are generally provided as internal integrated circuits in computers or other electronic devices. There are many types of memory devices including, but not limited to, volatile memory devices. One type of volatile memory device is a dynamic random access memory (DRAM) device. A DRAM device may include a memory array including DRAM cells arranged rows extending in a first horizontal direction and columns extending in a second horizontal direction. In one design configuration, an individual DRAM cell includes an access device (e.g., a transistor) and a storage node device (e.g., a capacitor) electrically connected to the access device. The DRAM cells of a DRAM device are electrically accessible through digit lines and word lines arranged along the rows and columns of the memory array and in electrical communication with control logic devices within a base control logic structure of the DRAM device.

Control logic devices within a base control logic structure underlying a memory array of a DRAM device have been used to control operations on the DRAM cells of the DRAM device. Control logic devices of the base control logic structure can be provided in electrical communication with digit lines and word lines coupled to the DRAM cells by way of routing and contact structures. Unfortunately, the quantities, dimensions, and arrangements of the different control logic devices employed within the base control logic structure can also undesirably impede reductions to the size (e.g., horizontal footprint) of a memory device, and/or improvements in the performance (e.g., faster memory cell ON/OFF speed, lower threshold switching voltage requirements, faster data transfer rates, lower power consumption) of the DRAM device.

DETAILED DESCRIPTION

Figure 1:
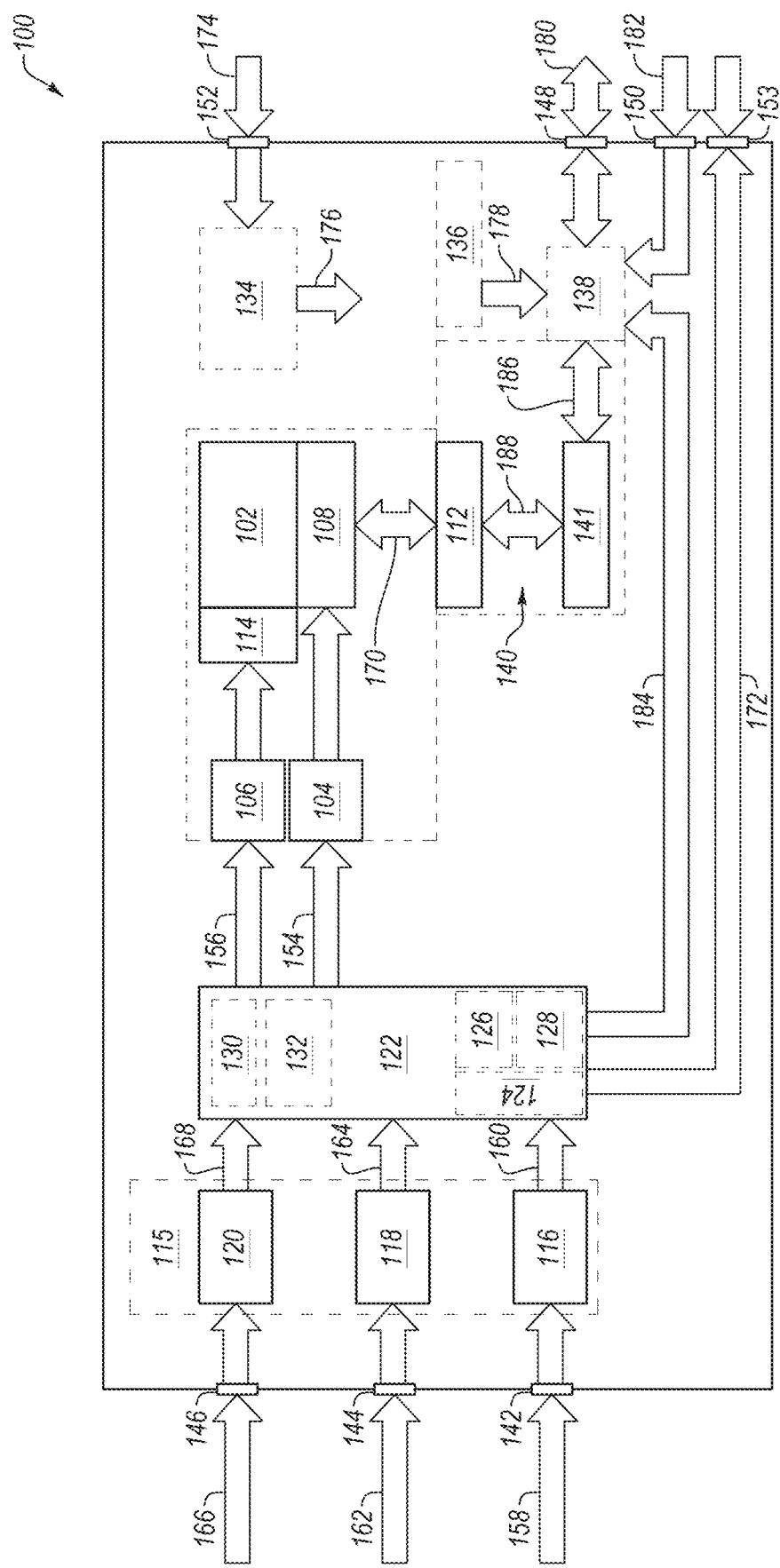
FIG. 1 is a simplified, schematic block diagram of a microelectronic device, in accordance with some embodiments of the disclosure.

The following description provides specific details, such as material compositions, shapes, and sizes, in order to provide a thorough description of embodiments of the disclosure. However, a person of ordinary skill in the art would understand that the embodiments of the disclosure may be practiced without employing these specific details. Indeed, the embodiments of the disclosure may be practiced in conjunction with conventional microelectronic device fabrication techniques employed in the industry. In addition, the description provided below does not form a complete process flow for manufacturing a microelectronic device (e.g., a memory device). The structures described below do not form a complete microelectronic device. Only those process acts and structures necessary to understand the embodiments of the disclosure are described in detail below. Additional acts to form a complete microelectronic device from the structures may be performed by conventional fabrication techniques.

Drawings presented herein are for illustrative purposes only, and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale. Additionally, elements common between figures may retain the same numerical designation.

As used herein, a "memory device" means and includes microelectronic devices exhibiting memory functionality, but not necessarily limited to memory functionality. Stated another way, and by way of non-limiting example only, the term "memory device" includes not only conventional memory (e.g., conventional volatile memory; conventional non-volatile memory), but also includes an application specific integrated circuit (ASIC) (e.g., a system on a chip (SoC)), a microelectronic device combining logic and memory, and a graphics processing unit (GPU) incorporating memory.

As used herein, the term "configured" refers to a size, shape, material composition, orientation, and arrangement of one or more of at least one structure and at least one apparatus facilitating operation of one or more of the structure and the apparatus in a pre-determined way.

As used herein, the terms "vertical," "longitudinal," "horizontal," and "lateral" are in reference to a major plane of a structure and are not necessarily defined by earth's gravitational field. A "horizontal" or "lateral" direction is a direction that is substantially parallel to the major plane of the structure, while a "vertical" or "longitudinal" direction is a direction that is substantially perpendicular to the major plane of the structure. The major plane of the structure is defined by a surface of the structure having a relatively large area compared to other surfaces of the structure. With reference to the figures, a "horizontal" or "lateral" direction may be perpendicular to an indicated "Z" axis, and may be parallel to an indicated "X" axis and/or parallel to an indicated "Y" axis; and a "vertical" or "longitudinal" direction may be parallel to an indicated "Z" axis, may be perpendicular to an indicated "X" axis, and may be perpendicular to an indicated "Y" axis.

As used herein, features (e.g., regions, structures, devices) described as "neighboring" one another means and includes features of the disclosed identity (or identities) that are located most proximate (e.g., closest to) one another. Additional features (e.g., additional regions, additional structures, additional devices) not matching the disclosed identity (or identities) of the "neighboring" features may be disposed between the "neighboring" features. Put another way, the "neighboring" features may be positioned directly adjacent one another, such that no other feature intervenes between the "neighboring" features; or the "neighboring" features may be positioned indirectly adjacent one another, such that at least one feature having an identity other than that associated with at least one the "neighboring" features is positioned between the "neighboring" features. Accordingly, features described as "vertically neighboring" one another means and includes features of the disclosed identity (or identities) that are located most vertically proximate (e.g., vertically closest to) one another. Moreover, features described as "horizontally neighboring" one another means and includes features of the disclosed identity (or identities) that are located most horizontally proximate (e.g., horizontally closest to) one another.

As used herein, the term "intersection" means and includes a location at which two or more features (e.g., regions, structures, materials, devices) or, alternatively, two or more portions of a single feature meet. For example, an intersection between a first feature extending in a first direction (e.g., an X-direction) and a second feature extending in a second direction (e.g., a Y-direction) different than the first direction may be the location at which the first feature and the second feature meet.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the phrase "coupled to" refers to structures operatively connected with each other, such as electrically connected through a direct Ohmic connection or through an indirect connection (e.g., by way of another structure).

As used herein, the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

FIG. 1 is a simplified, schematic block diagram of a microelectronic device 100 (e.g., a memory device, such as a DRAM device), in accordance with some embodiments of the disclosure. The microelectronic device 100 may include a control circuitry structure (e.g., a control circuitry wafer) vertically overlying a memory array structure (e.g., a memory array wafer). The memory array structure may include one or more array(s) of memory cells (e.g., volatile memory cells, such as DRAM cells). The control circuitry structure may include control logic devices formed of and including complementary metal-oxide-semiconductor (CMOS) circuitry. At least a majority of the CMOS circuitry (and, hence, the control logic devices) of the microelectronic device 100 may be located within the control circuitry structure (and, hence, outside of the memory array structure). In addition, at least some of the CMOS circuitry may be positioned vertically above within horizontal areas of the array(s) of memory cells. Accordingly, the microelectronic device 100 may be considered to have a so-called "CMOS above array (CaA)" configuration. In some embodiments, the control circuitry structure is formed, at least in part, separate from the memory array structure; and then the control circuitry structure is attached to the memory array structure using oxide-oxide bonding or a combination of oxide-oxide bonding and metal-metal bonding.

In FIG. 1, dashed boxes are employed to identify various features (e.g., various modules, various devices, various circuitry) that may be positioned within vertical boundaries the control circuitry structure of the microelectronic device 100 (as opposed to being positioned within vertical boundaries the memory array structure of the microelectronic device 100). All features (e.g., all modules, all devices, all circuitry) within a horizontal area of an individual dashed box depicted in FIG. 1 may be contained within the control circuitry structure of the microelectronic device 100; or some features (e.g., some modules, some devices, some circuitry) within the horizontal area of the individual dashed box may be contained within the control circuitry structure of the microelectronic device 100, and some within the horizontal area of the individual dashed box may be contained within the memory array structure of the microelectronic device 100. As described in further detail below, at least banks of memory cells of the microelectronic device 100 may be contained within the memory array structure, and may be in electrical communication with various control logic circuitry (e.g., CMOS circuitry) and devices contained within the control circuitry structure of the microelectronic device 100.

As shown in FIG. 1, the microelectronic device 100 may include an assembly of features (e.g., devices, circuitry, structures). For example, the microelectronic device 100 may include a memory array 102, a column address decoder 104, a row address decoder 106, sense amplifiers 108, word line (WL) drivers 114, command and address (CA) input circuitry 115, control registers circuitry 122, voltage generator circuitry 134, internal clock and timing generator circuitry 136, data I/O and control circuitry 138, and data path circuitry 140. The CA input circuitry 115 may include, without limitation, CA input buffer circuitry 116, control input buffer circuitry 118, and clock input buffer circuitry 120. The control registers circuitry 122 may include, without limitation, CA decoder circuitry 124, mode registers 126, test mode (TM) logic circuitry 128, self-refresh circuitry 130, and fuse circuitry 132. The data path circuitry 140 may include, without limitation, input/output (I/O) logic circuitry 112, and error correction code (ECC) circuitry 141. The microelectronic device 100 may further include terminals in electrical communication with external circuitry. For example, the microelectronic device 100 may include, without limitation, CA terminals 142, control input terminals 144, clock input terminals 146, data terminals 148, calibration terminals 150, power supply terminals 152, and alert terminals 153. The foregoing features and additional features of the microelectronic device 100 are described in further detail below. In additional, while FIG. 2 depicts a particular configuration of the microelectronic device 100, it will be appreciated that the microelectronic device 100 may include additional features (e.g., additional devices, additional circuitry, additional structures), different features (e.g., different devices, different circuitry, different structures), and/or a different arrangement of features than those schematically depicted in FIG. 1. FIG. 1 illustrates just one non-limiting example of the microelectronic device 100.

The memory array 102 may include multiple banks. Each of the banks may include multiple word lines extending in a first horizontal direction, multiple digit lines extending in a second horizontal direction orthogonal to the first horizontal direction, and multiple memory cells arranged at intersections of the word lines and the digit lines. Rows of the memory cells may be coupled to the word lines, and columns of the memory cells may be coupled to the digit lines. The memory cells of the memory array 102 may, for example, comprise DRAM cells, resistive random access memory (RRAM) cells, conductive bridge random access memory (conductive bridge RAM) cells, magnetic random access memory (MRAM) cells, phase change material (PCM) memory cells, phase change random access memory (PCRAM) cells, spin-torque-transfer random access memory (STTRAM) cells, oxygen vacancy-based memory cells, programmable conductor memory cells, or other types of memory cells. In some embodiments, the memory cells of the memory array 102 are DRAM cells. The memory array 102, including the word lines, the digit lines, and the memory cells thereof, may be positioned within the memory array structure (e.g., memory array wafer) of the microelectronic device 100.

The column address decoder 104 may be configured and operated to select particular digit lines of the memory array 102 based on a column address signal 154 received thereby. Optionally, the microelectronic device 100 may also include column repair circuitry in electrical communication with the column address decoder 104 and configured and operated to substitute a defective column of memory cells of the memory array 102 for a spare, non-defective column of memory cells of the memory array 102. The column repair circuitry may transform the column address signal 154 directed to the column address decoder 104 identifying the defective column of memory cells into another column address signal identifying the spare, non-defective column of memory cells. Defective columns of memory cells may, for example, be determined using the TM logic circuitry 128 of the microelectronic device 100. The column address decoder 104 and the column repair circuitry (if any) may be positioned within the control circuitry structure (e.g., control circuitry wafer) of the microelectronic device 100.

The sense amplifiers 108 may be configured and operated to receive digit line inputs from the digit lines selected by the column address decoder 104 and to generate digital data values during read operations. The sense amplifiers 108 may be connected to respective digit lines and to respective local I/O line pairs of the I/O logic circuitry 112. The sense amplifiers 108 may be positioned within the control circuitry structure of the microelectronic device 100.

The row address decoder 106 may be configured and operated to select particular word lines of the memory array 102 based on a row address signal 156 received thereby. Optionally the microelectronic device 100 may also include row repair circuitry in electrical communication with the row address decoder 106 and configured and operated to substitute a defective row of memory cells of the memory array 102 for a spare, non-defective row of memory cells of the memory array 102. The row repair circuitry may transform the row address signal 156 directed to the row address decoder 106 identifying the defective row of memory cells into another row address signal identifying the spare, non-defective row of memory cells. Defective rows of memory cells may, for example, be determined using the TM logic circuitry 128 of the microelectronic device 100. The row address decoder 106 and the row repair circuitry (if any) may be positioned within the control circuitry structure of the microelectronic device 100.

The WL drivers 114 may be in electrical communication with the row address decoder 106, and may be configured and operated to activate word lines of the memory array 102 based on word line selection commands received from the row address decoder 106. The memory cells lines of the memory array 102 may be accessed by way of access devices (e.g., transistors) of the memory cells for reading or programming by voltages placed on the word lines using the WL drivers 114. The WL drivers 114 may be positioned within the control circuitry structure of the microelectronic device 100.

As depicted in FIG. 1, the CA input buffer circuitry 116, the control input buffer circuitry 118, and the clock input buffer circuitry 120 of the CA input circuitry 115 may be positioned within the vertical boundaries the control circuitry structure of the microelectronic device 100. The CA input buffer circuitry 116, the control input buffer circuitry 118, and the clock input buffer circuitry 120 are respectively described in further detail below. The CA input circuitry 115 may be operatively associated with the CA terminals 142, the control input terminals 144, and the clock input terminals 146 of the microelectronic device 100, as also described in further detail below.

The CA input buffer circuitry 116 of the CA input circuitry 115 may be coupled to the CA terminals 142. The CA terminals 142 may receive, without limitation, external address signals and external command signals from an external memory controller, which are collectively referred to as external CA signals 158 herein. The CA input buffer circuitry 116 may receive the external CA signals 158 (e.g., external address signals, external command signals) from the CA terminals 142, and may generate internal address signals and internal command signals, collectively referred to as internal CA signals 160 herein. The internal CA signals 160 may be supplied to the CA decoder circuitry 124 of the control registers circuitry 122. In some embodiments, the CA input buffer circuitry 116 may also be coupled to the TM logic circuitry 128 of the control registers circuitry 122, and may relay commands associated with various TM functions thereto. In some such embodiments, the TM functions may be referred to as or include aspects of design-for-test (DFT) functions, such as trim setting functions (e.g., latching trim conditions without programing fuses), read/write timing functions, fuse access functions, built-in-self-test (BIST) functions, and connectivity test functions.

The control input buffer circuitry 118 of the CA input circuitry 115 may be coupled to the control input terminals 144. The control input terminals 144 may receive external control signals 162 from external circuitry, such as, without limitation, external chip selection (CS) signals, external clock enable (CKE) signals, external on-die termination (ODT) signals, and external reset signals. The control input buffer circuitry 118 may receive the external control signals 162 (e.g., external CS signals, external CKE signals, external ODT signals, external reset signals) from the control input terminals 144, and may generate associated internal control signals 164 (e.g., internal CS signals, internal CKE signals, internal ODT signals, internal reset signals). The internal control signals 164 may be supplied to the control registers circuitry 122 for the performance of memory operations. For example, internal CS signals may be used to select the microelectronic device 100 to respond to the external CA signals 158 directed to the CA terminals 142. As another example, internal CKE signals may be used to enable the clock input buffer circuitry 120 to receive various external clock signals, which the clock input buffer circuitry 120 may then act upon to generate various internal clock signals, as described in further detail below.

The clock input buffer circuitry 120 of the CA input circuitry 115 may be coupled to the clock input terminals 146. The clock input terminals 146 may receive external clock signals 166 from external circuitry, such as, without limitation, external clock (CK) signals, external /CK signals, external data clock (WCK) signals, and external /WCK signals. The external CK and /CK signals may be complementary, and the external WCK and /WCK signals may be also be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level. The clock input buffer circuitry 120 may receive the external clock signals 166 (e.g., external CK signals, external /CK signals, external WCK signals, external /WCK signals) from the clock input terminals 146, and may generate associated internal clock signals 168 (e.g., internal CK signals, internal /CK signals, internal WCK signals, internal /WCK signals), which may be supplied to internal clock circuitry to provide various phase and frequency controlled internal clock signals based on the received internal clock signals 168.

Still referring to FIG. 1, at least some (e.g., substantially all) of the control registers circuitry 122 may be positioned within the vertical boundaries the control circuitry structure of the microelectronic device 100. For example, the CA decoder circuitry 124, the mode registers 126, the TM logic circuitry 128, self-refresh circuitry 130, and fuse circuitry 132 of the control registers circuitry 122 may be positioned within the vertical boundaries the control circuitry structure of the microelectronic device 100.

The CA decoder circuitry 124 may include circuitry configured and operated to decode the internal CA signals 160 from the CA input buffer circuitry 116 to generate various internal signals and commands for performing memory operations. The CA decoder circuitry 124 may be configured and operated for address decoding functionality and command decoding functionality. For example, the CA decoder circuitry 124 may receive and decode internal address signals from the CA input buffer circuitry 116, and may supply the column address signal 154 (which may also be referred to as a "decoded column address signal") to the column address decoder 104, and may supply the row address signal 156 (which may also be referred to as a "decoded row address signal") to the row address decoder 106. The CA decoder circuitry 124 may also receive bank address signals, and may supply the bank address signals to the column address decoder 104 and the row address decoder 106. As another example, the CA decoder circuitry 124 may receive and decode internal command signals from the CA input buffer circuitry 116; and may generate various internal signals and commands for performing memory operations, such as a row command signal to select a word line and a column command signal to select a digit line. The internal command signals may also include output and input activation commands, such as clocked command.

The mode registers 126 may be configured and operated to track various counts or values (e.g., counts of refresh commands received by the microelectronic device 100 or self-refresh operations performed by the microelectronic device 100). In some embodiments, some of the mode registers 126 are configured to store operational parameters to provide flexibility in performing various functions, features, and modes, such as TM functions.

The TM logic circuitry 128 may be configured and operated to perform various TM functions defined by a manufacturer of the microelectronic device 100. Such TM functions may be used only by the manufacturer, rather than by an entity subsequently obtaining the microelectronic device 100 from the manufacturer. For example, the manufacturer may perform a connectivity test designed to speed up testing of electrical continuity of pin interconnections between the microelectronic device 100 and a host device (e.g., a memory controller). The TM logic circuitry 128 may be coupled to one or more mode registers 126. In some embodiments, the TM logic circuitry 128 reads the mode registers 126 to determine a specific TM function to perform based on data stored in the mode registers 126. In additional embodiments, the TM logic circuitry 128 stores data in the mode registers 126, such that other functional blocks in the microelectronic device 100 perform desired functions based on the data (e.g., data related to various TM functions and/or DFT functions) stored in the mode registers 126.

The self-refresh circuitry 130 may be in electrical communication with the row address decoder 106, and may be configured and operated to periodically recharge the data stored in the memory array 102. During a self-refresh operation, the self-refresh circuitry 130 may be activated in response to an internal command signal, and may generate different row address signals that may be forwarded to the row address decoder 106. The row address decoder 106 may then select particular word lines based on the different row address signals received from the self-refresh circuitry 130. The row address decoder 106 may then communicate with the WL drivers 114 to activate the selected word lines, and charges accumulated in storage nodes (e.g., capacitors) of the memory array 102 operatively associated with the selected word lines may then be amplified by a sense amplifier and then stored in the capacitors again.

The fuse circuitry 132 may include an array of fuses that may be one-time programmable nonvolatile memory elements. In some embodiments, the fuse circuitry 132 may be replaced with an array of other nonvolatile memory elements, such as metal switches, blown capacitor devices, transistors with blown gate-oxide, NAND memory cells, PCM cells, magnetic memory cells. The fuse circuitry 132 may store various operational information for the microelectronic device 100 by programming one or more fuses therein, such as trim setting conditions including specific timing and/or voltage parameters, read/write clock conditions based on the read/write timing outcomes, control bits to enable or disable customer specific features or functionality, redundancy implementation information used for repairing a portion of the memory array 102. In some embodiments, the fuses in the fuse circuitry 132 may exhibit a high-resistance state (e.g., logic 0) upon fabricating the microelectronic device 100 (e.g., by way of an oxide layer disposed between two conductive layers). One or more fuses in the fuse circuitry 132 may be programmed to exhibit a low-resistance state (e.g., logic 1) when a fuse programming voltage or current is applied across the one or more fuses (e.g., by physically altering the oxide layer by means of electrical stress such that the two conductive layers are connected via a conductive path). As such, once the fuses are programmed (e.g., the oxide layer is ruptured to exhibit a low-resistance state, logic 1), the programmed fuses may not be un-programmed (e.g., restoring their original high-resistance state, logic 0). Such fuses may be referred to as antifuses.

As depicted in FIG. 1, the control registers circuitry 122 may generate the column address signals 154 and the row address signals 156 that are supplied to the column address decoder 104 and the row address decoder 106, respectively. As previously discussed herein, the row address decoder 106 may be coupled to the WL drivers 114 that activate respective rows of memory cells in the memory array 102 corresponding to received row addresses. In addition, selected digit line(s) corresponding to a received column address may be coupled to read/write circuitry to provide read data to a data output buffer of the I/O logic circuitry 112 by way of an I/O data bus 170. Write data may be applied to the memory array 102 through a data input buffer of the I/O logic circuitry 112 and the read/write circuitry.

The control registers circuitry 122 may also be in electrical communication with the alert terminals 153, and may supply alert signals 172 to external circuitry (e.g., a system processor, a controller) in electrical communication with the alert terminals 153 if certain errors are detected. As a non-limiting example, an alert signal 172 may be transmitted from the microelectronic device 100 if a cyclic redundancy check (CRC) error is detected.

The voltage generator circuitry 134 may be coupled to the power supply terminals 152. The power supply terminals 152 may receive various potentials 174 from external circuitry, such as, without limitation, drain supply voltage ($V_{DD}$) potentials, supply voltage ($V_{CC}$) potentials, and ground ($V_{SS}$) potentials. The voltage generator circuitry 134 generates various internal potentials 176, such as, without limitation, pump pre-charge ($V_{PP}$) potentials (or read/write bias potentials), $V_{OD}$ potentials, array voltage ($V_{ARY}$) potentials, periphery voltage ($V_{PERI}$) potentials, and $V_{POP}$ potentials. By way of non-limiting example, $V_{PP}$ potentials may be employed for the row address decoder 106; $V_{OD}$ and $V_{ARY}$ potentials may be employed for the sense amplifiers 108; $V_{PERI}$ potentials may be employed for other circuitry blocks; and $V_{POP}$ potentials may be employed for the fuse circuitry 132. The power supply terminals 152 and the voltage generator circuitry 134 may also be supplied with output driver supply ($V_{DDQ}$) potentials and $V_{SSQ}$ potentials. The $V_{DDQ}$ potentials and the $V_{SSQ}$ potentials may be supplied to the data I/O and control circuitry 138. The $V_{DDQ}$ and $V_{SSQ}$ potentials may respectively be the same as the $V_{DD}$ and $V_{SS}$ potentials, but the $V_{DDQ}$ and $V_{SSQ}$ potentials may be employed for the data I/O and control circuitry 138 so that power supply noise generated by the data I/O and control circuitry 138 does not propagate to the other circuitry. The voltage generator circuitry 134 may be positioned within the vertical boundaries the control circuitry structure of the microelectronic device 100.

The internal clock and timing generator circuitry 136 may be configured to receive the clock signals (e.g., internal clock signals, external clock signals) and to generate phase controlled internal clock signals 178 in response thereto. Although not limited thereto, one or more of delay lock loop (DLL) circuitry and phase lock loop (PLL) circuitry may be employed for the internal clock and timing generator circuitry 136. DLL circuitry and PLL circuitry may serve similar purposes, and may respectively be used to maintain fixed timing relationship between signals in environments where process, voltage, and temperature variations cause these relationships to change over time. During operation, DLL circuitry and PLL circuitry may continuously compare the relationship between two signals and provide feedback to adjust and maintain a fixed relationship between them. DLL circuitry and PLL circuitry may be employed to maintain the timing relationship between a clock signal and an output data signal. Maintaining the timing relationships between the clock and output data with DLL circuitry and PLL circuitry results in improved timing margins and facilitates faster signaling speeds. In some embodiments, the internal clock and timing generator circuitry 136 at least includes DLL circuitry. The DLL circuitry may include, without limitation, one or more (e.g., each) of DLL differential delay line and delay select logic circuits, DLL clock phase interpolator circuits, DLL output clock comparator circuits, DLL output circuits, DLL phase detectors circuits, DLL clock inversion control circuits, DLL control (coarse and fine control) logic circuits, DLL bias generator control circuits, DLL auto-reset block circuits, DLL enable logic circuits, bit line jitter circuits, and Ltree stage circuits. The phase controlled internal clock signals 178 generated by the internal clock and timing generator circuitry 136 may, for example, be supplied to the data I/O and control circuitry 138, and may be used as timing signals for determining output timing of read data. The internal clock and timing generator circuitry 136 may be positioned within the vertical boundaries the control circuitry structure of the microelectronic device 100.

The data I/O and control circuitry 138, which may also be referred to herein as data queue (DQ) circuitry, may be coupled to the data terminals 148 (e.g., DQ terminals, read data strobe (RDQS) terminals, data bus inversion (DBI) terminals, DMI terminals) and the calibration terminals 150 (e.g., ZQ terminals). In addition, the data I/O and control circuitry 138 may also be in electrical communication with the control registers circuitry 122, the voltage generator circuitry 134, the internal clock and timing generator circuitry 136, and the data path circuitry 140. The data I/O and control circuitry 138 may receive and supply data signals 180 (e.g., DQ signals, such as read DQ signals and write DQ signals; DBI signals, DMI signals) to the data terminals 148 in response to different commands (e.g., read commands, write commands). In addition, the data I/O and control circuitry 138 may communicate with the ECC circuitry 141 of the data path circuitry 140 by way of a global I/O data bus 186. Furthermore, the data I/O and control circuitry 138 may also receive and act upon, without limitation, phase controlled internal clock signals 178 from the internal clock and timing generator circuitry 136, calibration signals 182 from the calibration terminals 150, and I/O control signals 184 from the control registers circuitry 122. The data I/O and control circuitry 138 may include, without limitation, read circuits, write circuits, write parallelize, read training control, input buffer circuits, input buffer latch circuits, decision feedback equalizer (DFE) circuits, device interface board (DIB) circuits, DQ shift (data que pin connection/shifter) circuits, data que strobe (DQS) circuits, DQS receiver path circuits, phase generator circuits, DCC circuits, DCRC circuits, clock and power control circuits, read control circuits, data serializer circuits, and data output buffer circuits. The data I/O and control circuitry 138 may be positioned within the vertical boundaries the control circuitry structure of the microelectronic device 100.

Still referring to FIG. 1, at least some (e.g., substantially all) of the data path circuitry 140 may be positioned within the vertical boundaries the control circuitry structure of the microelectronic device 100. For example, the I/O logic circuitry 112 and the ECC circuitry 141 of the data path circuitry 140 may be positioned within the vertical boundaries the control circuitry structure of the microelectronic device 100.

The I/O logic circuitry 112 may be configured and operated to receive data from digit lines selected by the column address decoder 104 during read operations, and to output data to digit lines selected by the column address decoder 104 during write operations. During read operations, digital data values generated by the sense amplifiers 108 may be supplied to a data output buffer of the I/O logic circuitry 112 by way of the I/O data bus 170. In addition, during write operations, write data from a data input buffer of the I/O logic circuitry 112 may be supplied to the memory array 102 by way of the I/O data bus 170.

The ECC circuitry 141 may be configured and operated to generate ECC code (also known as "check bits"). The ECC code may correspond to a particular data value, and may be stored along with the data value in a memory cell of the memory array 102. When the data value is read back from the memory cell, another ECC code is generated and compared with the previously-generated ECC code to access the memory cell. If non-zero, the difference in the previously-generated ECC code and the newly-generated ECC code indicates that an error has occurred. If an error condition is detected, the ECC circuitry 141 may then be utilized to correct the erroneous data. The ECC circuitry 141 may be in electrical communication with the I/O logic circuitry 112 by way of a mid I/O data bus 188, and may be in electrical communication with of the data I/O and control circuitry 138 by way of the global I/O data bus 186.

During use and operation of the microelectronic device 100, when a read command is issued and a row address and a column address are timely supplied with the read command, read data can be read from memory cells in the memory array 102 designated by the row address and the column address. The read command may be received by the CA decoder circuitry 124, which may provide internal commands to the data I/O and control circuitry 138 so that read data may be output from the data terminals 148 (e.g., data queue (DQ) terminals, read data strobe (RDQS) terminals, data bus inversion (DBI) terminals, DMI terminals) by way of read/write amplifiers and the data I/O and control circuitry 138 according to clock signals (e.g., internal CK signals, internal /CK signals). The read data may be provided at a time defined by read latency information that can be programmed in the microelectronic device 100 in a mode register 126. The read latency information can be defined in terms of clock cycles of the clock signal. For example, the read latency information can be a number of clock cycles of the signal after the read command is received by the microelectronic device 100 when the associated read data is provided.

In addition, during use and operation of the microelectronic device 100, when a write command is issued and a row address and a column address are timely supplied with the write command, write data can be supplied to the data terminals 148 (e.g., data queue (DQ) terminals, read data strobe (RDQS) terminals, data bus inversion (DBI) terminals, DMI terminals) according to other clock signals (e.g., internal WCK signals, internal /WCK signals). The write command may be received by the CA decoder circuitry 124, which may provide internal commands to the data I/O and control circuitry 138 so that the write data can be received by data receivers in the data I/O and control circuitry 138, and supplied by way of the data I/O and control circuitry 138 and the read/write amplifiers to the memory array 102. The write data may be written in the memory cell designated by the row address and the column address. The write data may be provided to the data terminals 148 at a time defined by write latency information. The write latency information may be programmed in the microelectronic device 100 in a mode register 126. The write latency information may be defined in terms of clock cycles of the clock signal. For example, the write latency information may be a number of clock cycles of the signal after the write command is received by the microelectronic device 100 when the associated write data is received.

Figure 2A:
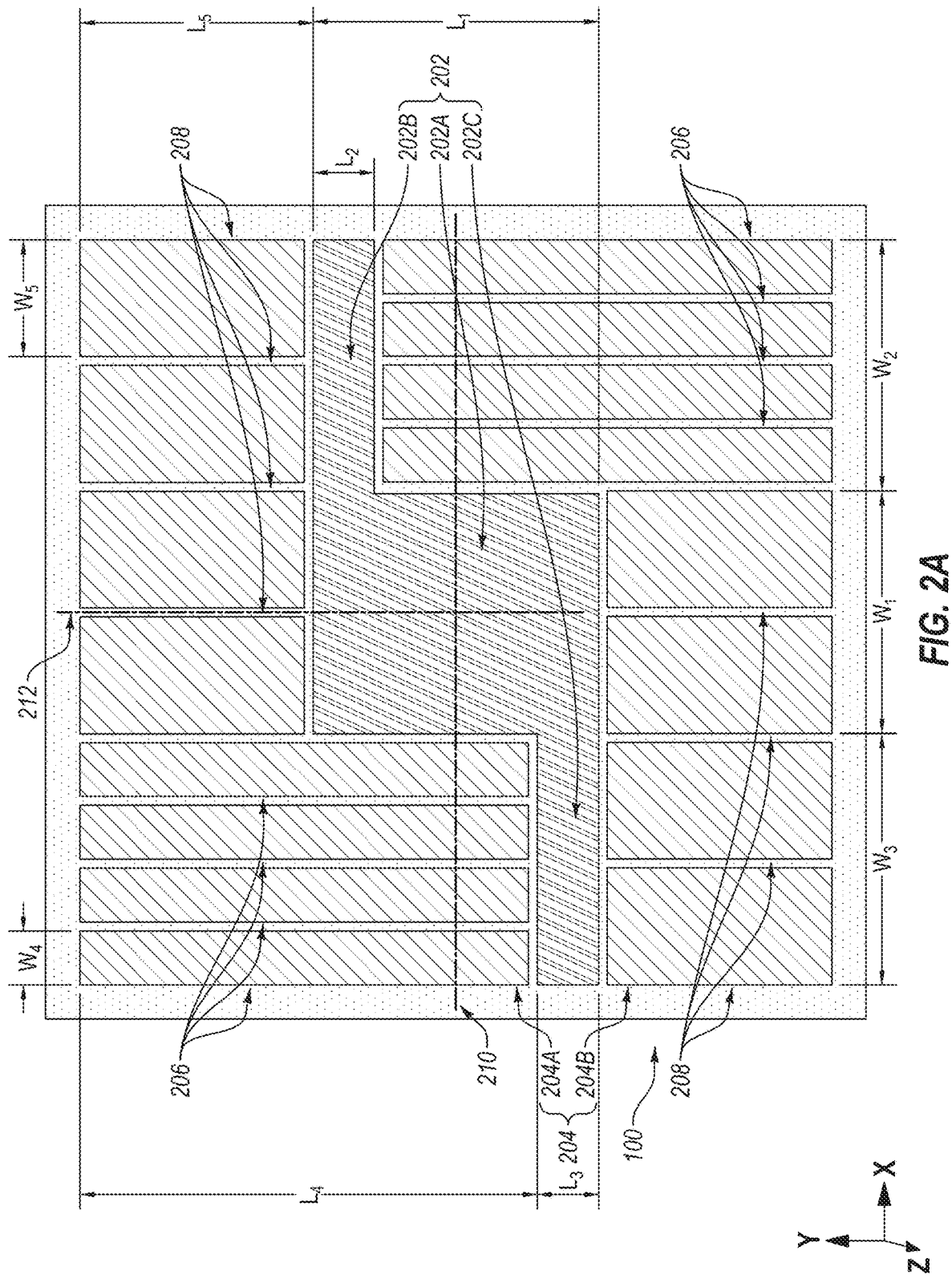
FIG. 2A is a simplified, schematic view of the microelectronic device of FIG. 1, illustrating a general layout of different regions of the microelectronic device, in accordance with some embodiments of the disclosure.
Figure 2B:
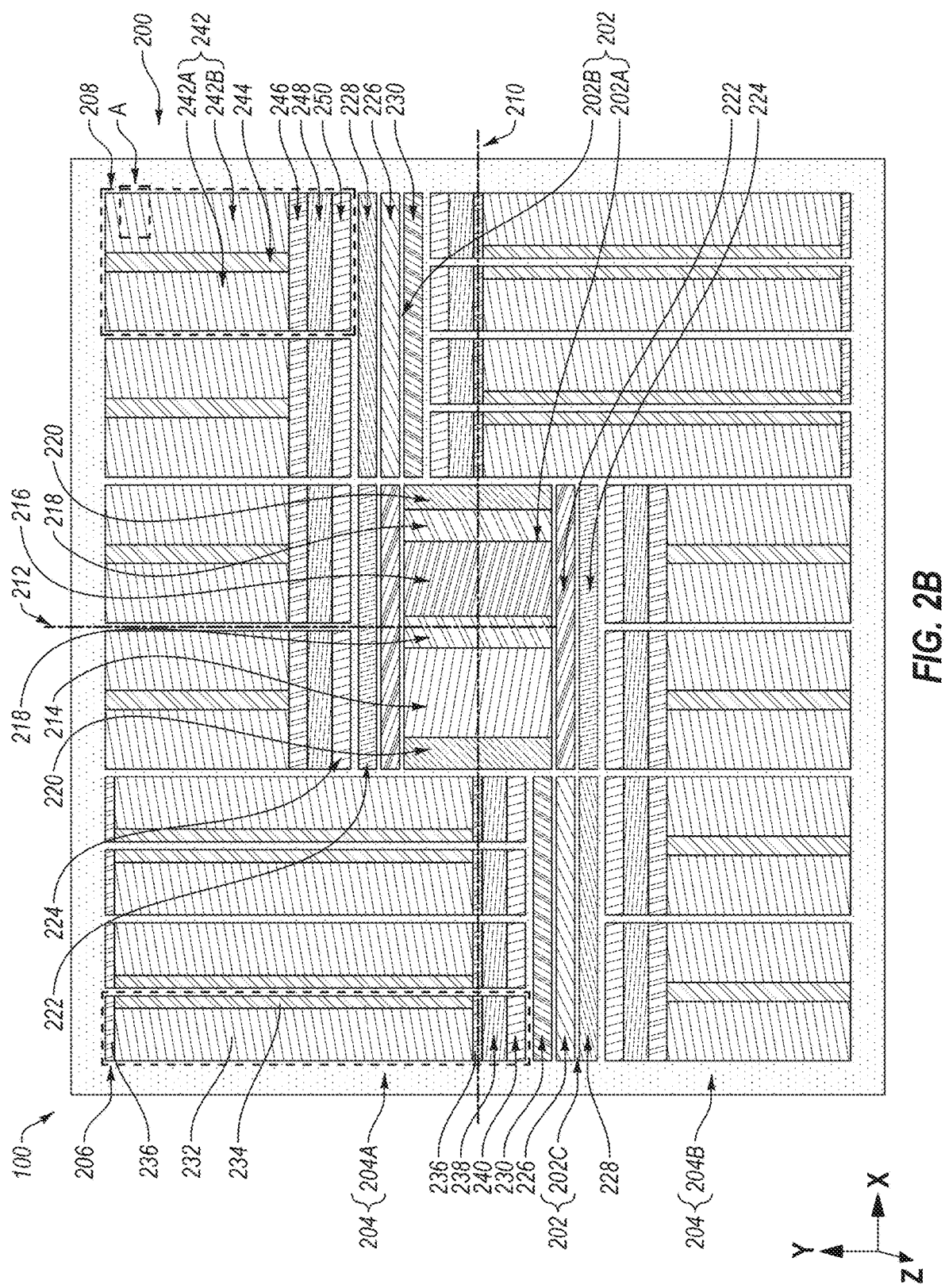
FIG. 2B is a simplified, schematic view of a control circuitry structure of the microelectronic device depicted in FIG. 2A, showing arrangements of various circuitry of the control circuitry structure within the different regions of the microelectronic device, in accordance with some embodiments of the disclosure.
Figure 2C:
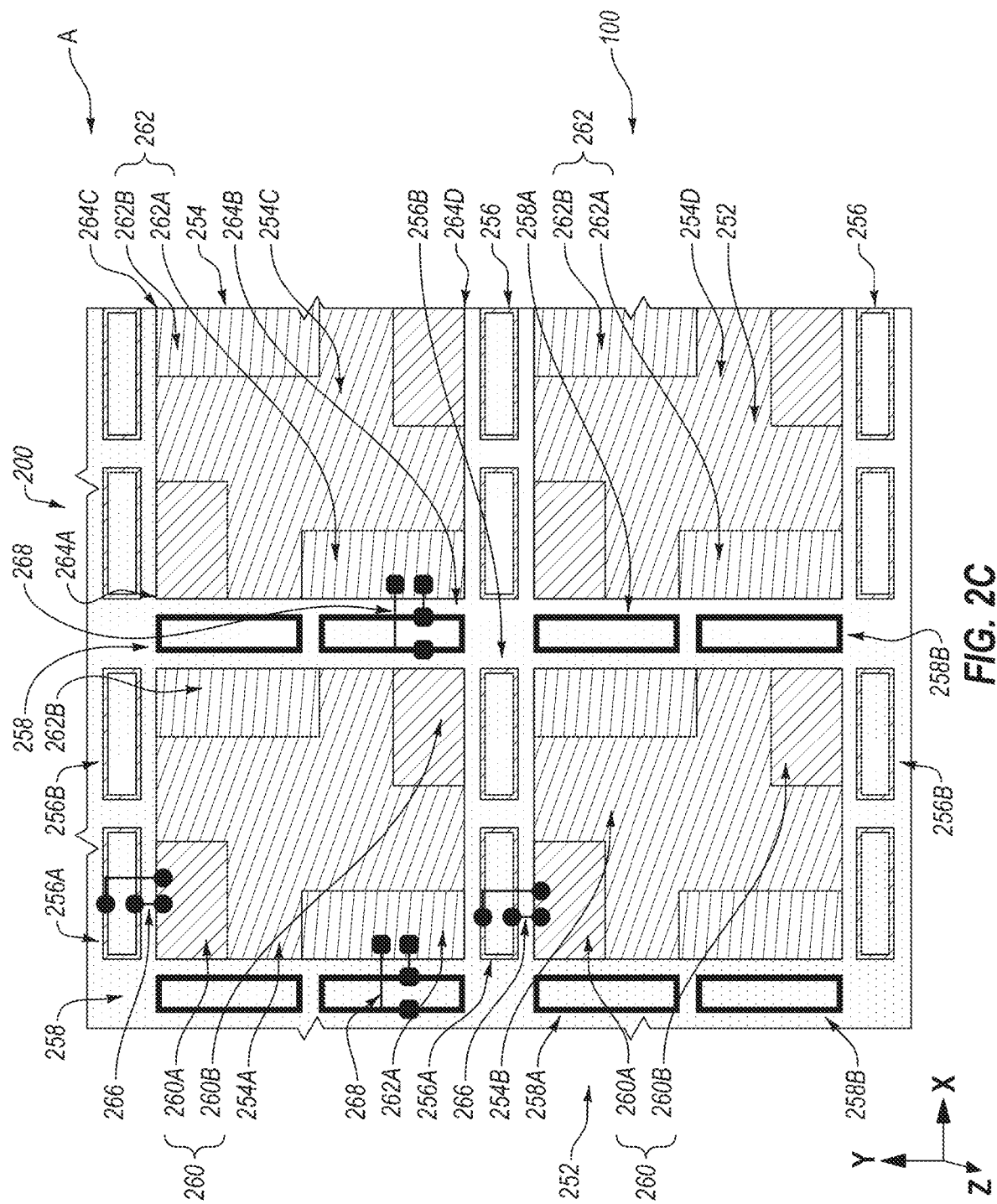
FIG. 2C is a simplified, schematic view of a portion of the control circuitry structure depicted in FIG. 2B, illustrating an arrangement of some circuitry of the control circuitry structure within the portion, in accordance with some embodiments of the disclosure.
Figure 2D:
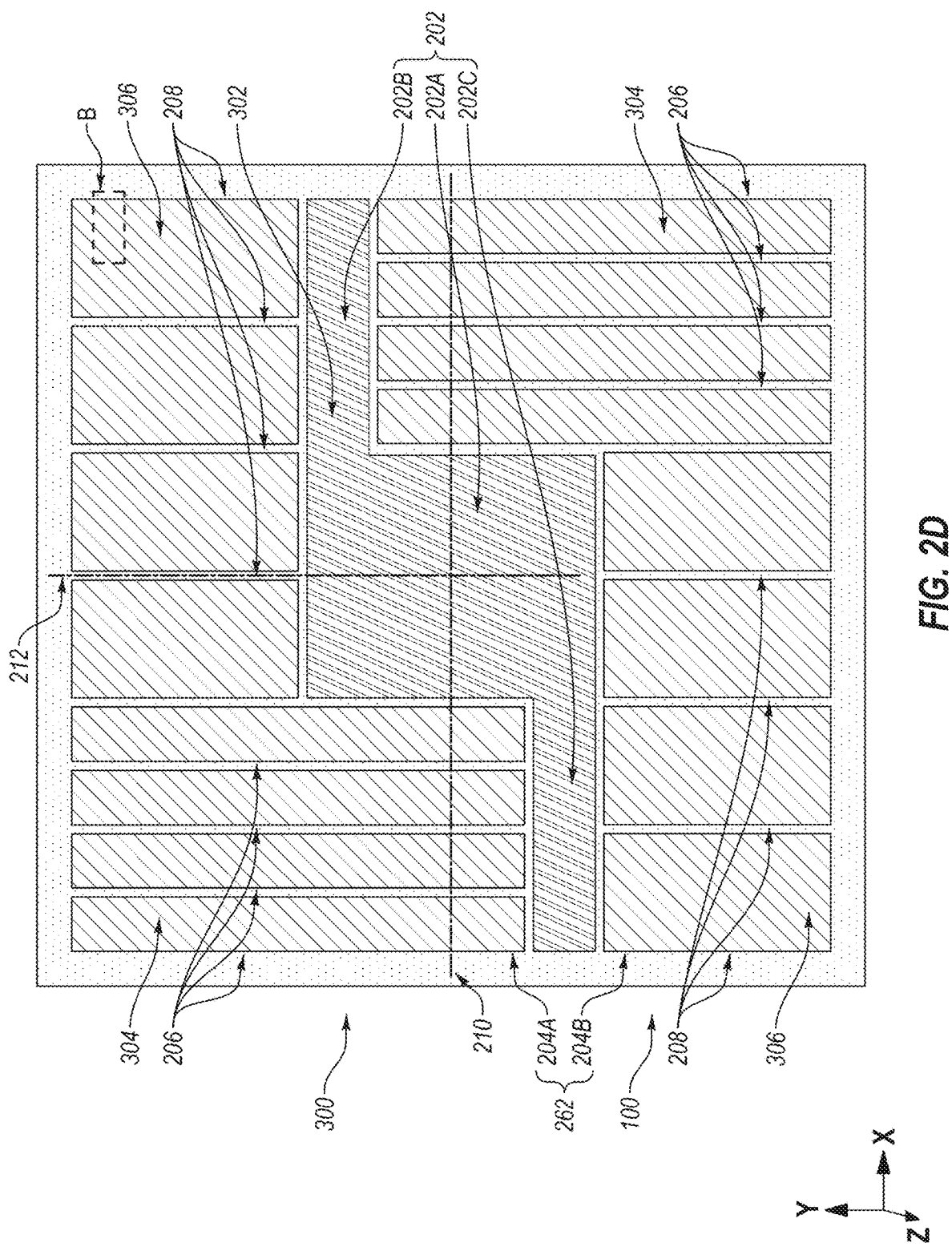
FIG. 2D is a simplified, schematic view of a memory array structure of the microelectronic device depicted in FIG. 2A, showing arrangements of various circuitry of the memory array structure within the different regions of the microelectronic device, in accordance with some embodiments of the disclosure.
Figure 2E:
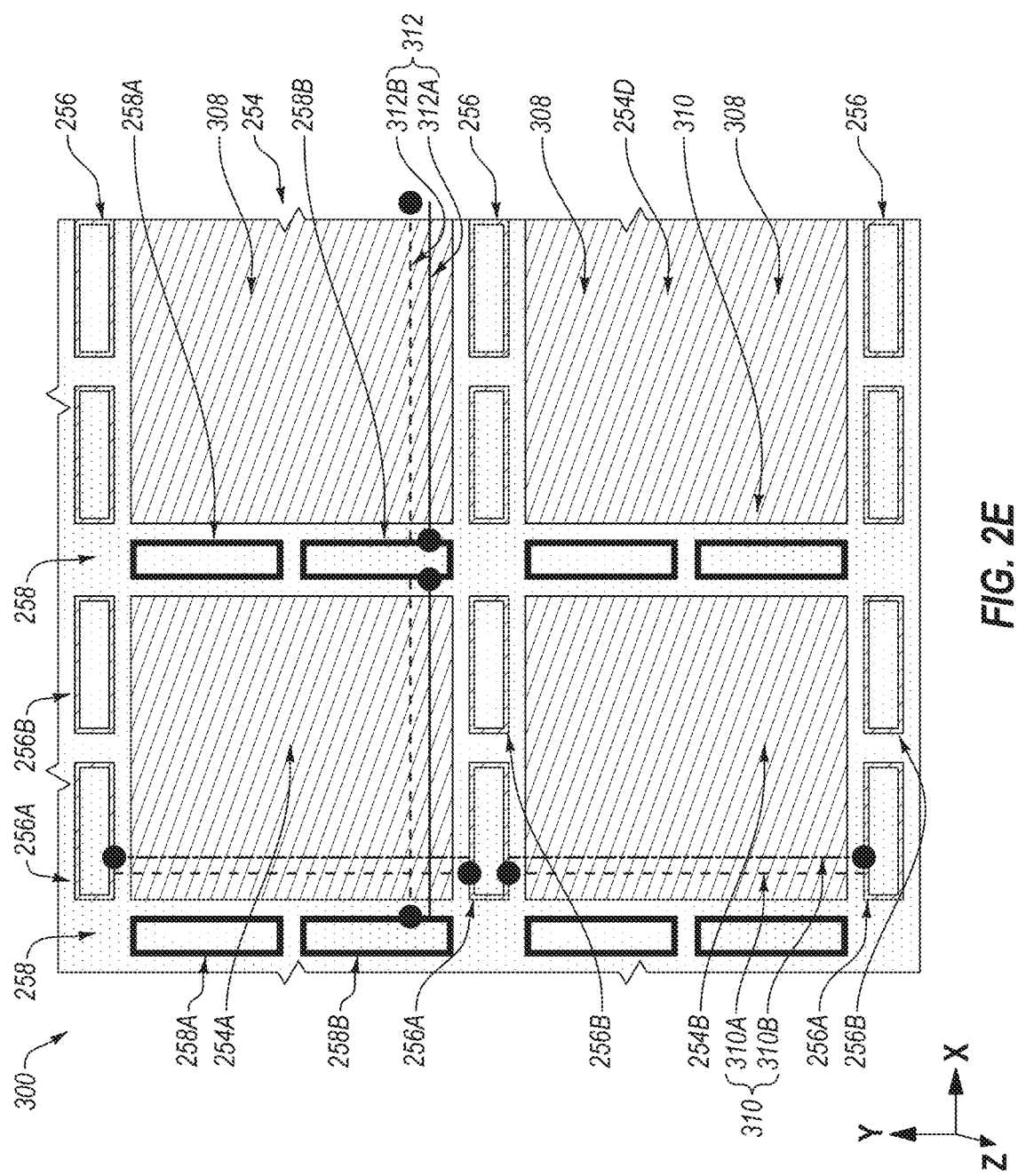
FIG. 2E is a simplified, schematic view of a portion of the memory array structure shown in FIG. 2D, illustrating an arrangement of some circuitry of the memory array structure within the portion, in accordance with some embodiments of the disclosure.

FIGS. 2A through 2E are simplified, schematic views of different portions of the microelectronic device 100 shown in FIG. 1, in accordance with some embodiments of the disclosure. FIG. 2A is a simplified, schematic view of the microelectronic device 100, which illustrates a general layout (e.g., floor plan) of different regions of the microelectronic device 100, in accordance with some embodiments of the disclosure. FIG. 2B is a simplified, schematic view of a control circuitry structure 200 of the microelectronic device 100, showing arrangements of various circuitry of the control circuitry structure 200 within the different regions of the microelectronic device 100, in accordance with some embodiments of the disclosure. FIG. 2C is a simplified, schematic view of a portion A (illustrated with a dashed box in FIG. 2B) of the control circuitry structure 200 shown in FIG. 2B, illustrating an arrangement of some circuitry of the control circuitry structure 200 within the portion A, in accordance with some embodiments of the disclosure. FIG. 2D is a simplified, schematic view of a memory array structure 300 of the microelectronic device 100, showing arrangements of various circuitry of the memory array structure 300 within the different regions of the microelectronic device 100, in accordance with some embodiments of the disclosure. FIG. 2E is a simplified, schematic view of a portion B (illustrated with a dashed box in FIG. 2B) of the memory array structure 300 shown in FIG. 2D, illustrating an arrangement of some circuitry of the memory array structure 300 within the portion B, in accordance with some embodiments of the disclosure.

Referring to FIG. 2A, the microelectronic device 100 may include a periphery circuitry region 202 and bank regions 204. As described in further detail below, within the control circuitry structure 200 (FIG. 2B), relatively more speed-critical circuitry and devices may be positioned within the horizontal area of the periphery circuitry region 202, and relatively less speed-critical circuitry and devices may be positioned within the horizontal areas of the bank regions 204. Relatively more speed-critical circuitry and devices of the control circuitry structure 200 (FIG. 2B) includes, for example, data bus (DB) circuitry, data bus strobe (DQS) circuitry, delay lock loop (DLL) circuitry, phase lock loop (PLL) circuitry, and command address (CA) circuitry. Relatively less speed-critical circuitry and devices of the control circuitry structure 200 (FIG. 2B) includes, for example, antifuse circuitry, repair circuitry, voltage generator circuitry, analog temperature dispense circuitry, and data junction multiplexer circuitry. The bank regions 204 may include a first bank region 204A (e.g., an upper bank region) and a second bank region 204B (e.g., a lower bank region). The periphery circuitry region 202 may be horizontally interposed (e.g., in the Y-direction) between the first bank region 204A and the second bank region 204B.

The periphery circuitry region 202 of the microelectronic device 100 may include central sub-region 202A, a first arm sub-region 202B, and a second arm sub-region 202C. As shown in FIG. 2A, the central sub-region 202A may be integral and continuous with the first arm sub-region 202B and the second arm sub-region 202C, and may be horizontally interposed between the first arm sub-region 202B and the second arm sub-region 202C in the X-direction (e.g., a first horizontal direction). The first arm sub-region 202B and the second arm sub-region 202C may be positioned at or proximate opposite corners (e.g., diagonally opposite corners) of the central sub-region 202A than one another. For example, the first arm sub-region 202B may be positioned at or proximate a first corner of the central sub-region 202A, and the second arm sub-region 202C may be positioned at or proximate a second corner of the central sub-region 202A located diagonally opposite (e.g., kitty-corner) the first corner. Accordingly, the periphery circuitry region 202 may extend in a non-linear path in the X-direction across the microelectronic device 100.

As shown in FIG. 2A, the central sub-region 202A, the first arm sub-region 202B, and the second arm sub-region 202C may exhibit rectangular horizontal cross-sectional shapes, which, in combination, provide the periphery circuitry region 202 with an irregular horizontal cross-sectional shape. A rectangular horizontal cross-sectional shape of the central sub-region 202A may be different than rectangular horizontal cross-sectional shapes of the first arm sub-region 202B and the second arm sub-region 202C. The rectangular horizontal cross-sectional shapes of the first arm sub-region 202B and the second arm sub-region 202C may be substantially the same as one another, or may be different than one another. In some embodiments, the rectangular horizontal cross-sectional shapes of the first arm sub-region 202B and the second arm sub-region 202C are substantially the same as one another.

In some embodiments, a horizontal center of the central sub-region 202A of the periphery circuitry region 202 is substantially aligned with a horizontal center of the microelectronic device 100. For example, a horizontal centerline, in the Y-direction, of the central sub-region 202A may be substantially aligned with a horizontal centerline 210, in the Y-direction, of the microelectronic device 100; and an additional horizontal centerline, in the X-direction, of the central sub-region 202A may be substantially aligned with an additional horizontal centerline 212, in the X-direction, of the microelectronic device 100. The horizontal centerline 210, in the Y-direction, of the microelectronic device 100 may substantially linearly extend in the X-direction; and the additional horizontal centerline 212, in the X-direction, of the microelectronic device 100 may substantially linearly extend in the Y-direction. In additional embodiments, the horizontal center of the central sub-region 202A of the periphery circuitry region 202 is offset from the horizontal center of the microelectronic device 100. For example, a horizontal centerline, in the Y-direction, of the central sub-region 202A may be offset from the horizontal centerline 210, in the Y-direction, of the microelectronic device 100; and/or a horizontal centerline in the X-direction of the central sub-region 202A may be offset from the additional horizontal centerline 212, in the X-direction, of the microelectronic device 100.

Horizontal centers of the first arm sub-region 202B and the second arm sub-region 202C of the periphery circuitry region 202 are offset from the horizontal center of the microelectronic device 100. A horizontal centerline, in the Y-direction, of the first arm sub-region 202B may offset from the horizontal centerline 210, in the Y-direction, of the microelectronic device 100, as well as horizontal centerlines, in the Y-direction, of each of the central sub-region 202A and the second arm sub-region 202C. An additional horizontal centerline, in the X-direction, of the first arm sub-region 202B may offset from the additional horizontal centerline 212, in the X-direction, of the microelectronic device 100, as well as additional horizontal centerlines, in the X-direction, of each of the central sub-region 202A and the second arm sub-region 202C. In addition, a horizontal centerline, in the Y-direction, of the second arm sub-region 202C may offset from the horizontal centerline 210, in the Y-direction, of the microelectronic device 100, as well as horizontal centerlines, in the Y-direction, of each of the central sub-region 202A and the first arm sub-region 202B. An additional horizontal centerline, in the X-direction, of the second arm sub-region 202C may be offset from the additional horizontal centerline 212, in the X-direction, of the microelectronic device 100, as well as additional horizontal centerlines, in the X-direction, of each of the central sub-region 202A and the first arm sub-region 202B. In some embodiments, horizontal centerlines, in the Y-direction, of the first arm sub-region 202B and the second arm sub-region 202C are offset from a horizontal centerline, in the Y-direction, of the central sub-region 202A by substantially the same horizontal distance as one another (e.g., in the positive Y-direction for the first arm sub-region 202B, and in the negative Y-direction for the second arm sub-region 202C). In additional embodiments, horizontal centerlines, in the Y-direction, of the first arm sub-region 202B and the second arm sub-region 202C are offset from a horizontal centerline, in the Y-direction, of the central sub-region 202A by different horizontal distances than one another.

As shown in FIG. 2A, the central sub-region 202A of the periphery circuitry region 202 may have a first length $L_1$ in the Y-direction and a first width $W_1$ in the X-direction; the first arm sub-region 202B of the periphery circuitry region 202 may have a second length $L_2$ in the Y-direction and a second width $W_2$ in the X-direction; and the second arm sub-region 202C of the periphery circuitry region 202 may have a third length $L_3$ in the Y-direction and a third width $W_3$ in the X-direction. The first length $L_1$ of the central sub-region 202A may be greater than each of the second length $L_2$ of the first arm sub-region 202B and the third length $L_3$ of the second arm sub-region 202C. In some embodiments, the first length $L_1$ of the central sub-region 202A is greater than a combined length of the second length $L_2$ of the first arm sub-region 202B and the third length $L_3$ of the second arm sub-region 202C. The second length $L_2$ of the first arm sub-region 202B may be substantially equal to the third length $L_3$ of the second arm sub-region 202C; or the second length $L_2$ of the first arm sub-region 202B may be different than the third length $L_3$ of the second arm sub-region 202C. In addition, the first width $W_1$ of the central sub-region 202A, the second width $W_2$ of the first arm sub-region 202B, and the third width $W_3$ of the second arm sub-region 202C may be substantially equal to one another; or at least one of the first length $W_1$ of the central sub-region 202A, the second width $W_2$ of the first arm sub-region 202B, and the third width $W_3$ of the second arm sub-region 202C may be different than (e.g., greater than, less than) at least one other (e.g., one other, two other) of the first length $W_1$ of the central sub-region 202A, the second width $W_2$ of the first arm sub-region 202B, and the third width $W_3$ of the second arm sub-region 202C. In some embodiments, the first length $W_1$ of the central sub-region 202A, the second width $W_2$ of the first arm sub-region 202B, and the third width $W_3$ of the second arm sub-region 202C are substantially equal to one another. In some embodiments, the second width $W_2$ of the first arm sub-region 202B and the third width $W_3$ of the second arm sub-region 202C are substantially equal to one another, and are different than (e.g., greater than, less than) the first length $W_1$ of the central sub-region 202A.

Still referring to FIG. 2A, the bank regions 204 (e.g., the first bank region 204A, the second bank region 204B) may individually include a combination of first bank sub-regions 206 and second bank sub-regions 208. As described in further detail below, within the memory array structure 300 (FIG. 2D) of the microelectronic device 100, banks of memory cells may be positioned within the horizontal areas of the first bank sub-regions 206 and the second bank sub-regions 208 of the bank regions 204. The first bank sub-regions 206 may have different horizontal geometric configurations (e.g., different horizontal dimensions, different horizontal shapes) than the second bank sub-regions 208. For example, individual first bank sub-regions 206 may be relatively longer in the Y-direction and relatively narrower in the X-direction than individual second bank sub-regions 208. However, as described in further detail below, a quantity of memory cells within a bank of memory cells within a horizontal area of an individual first bank sub-region 206 may be substantially equal to a quantity of memory cells within an additional bank of memory cells within a horizontal area of an individual second bank sub-region 208.

The bank regions 204 (e.g., the first bank region 204A, the second bank region 204B) of the microelectronic device 100 individually include a group of the first bank sub-regions 206 and a group of the second bank sub-regions 208. For example, the first bank region 204A may include a group of the first bank sub-regions 206, and a group of the second bank sub-regions 208 horizontally neighboring the group of the first bank sub-regions 206 in the X-direction (e.g., the positive X-direction); and the second bank region 204B may include an additional group of the first bank sub-regions 206, and an additional group of the second bank sub-regions 208 horizontally neighboring the additional group of the first bank sub-regions 206 in the X-direction (e.g., the negative X-direction). For an individual bank region 204, a combination of the group of the first bank sub-regions 206 and the group of the second bank sub-regions 208 thereof may provide the bank region 204 with an irregular horizontal cross-sectional shape, such as an "L-shaped" horizontal cross-sectional shape. A horizontal cross-sectional shape (e.g., L-shaped horizontal cross-sectional shape) of the first bank region 204A may be inverted (e.g., flipped) in the X-direction relative to a horizontal cross-sectional shape (e.g., L-shaped horizontal cross-sectional shape) of the second bank region 204B.

As shown in FIG. 2A, a group of the first bank sub-regions 206 of the first bank region 204A may be completely horizontally offset from an additional group of the first bank sub-regions 206 of the second bank region 204B in the X-direction; and the group of the first bank sub-regions 206 of the first bank region 204A may partially (e.g., less than completely) horizontally overlap the additional group of the first bank sub-regions 206 of the second bank region 204B in the Y-direction. In addition, as shown in FIG. 2A, a group of the second bank sub-regions 208 of the first bank region 204A may be completely horizontally offset from an additional group of the second bank sub-regions 208 of the second bank region 204B in the Y-direction; and the group of the second bank sub-regions 208 of the first bank region 204A may partially (e.g., less than completely) horizontally overlap the additional group of the second bank sub-regions 208 of the second bank region 204B in the X-direction.

The central sub-region 202A of the periphery circuitry region 202 may be horizontally interposed between the group of the first bank sub-regions 206 of the first bank region 204A and the additional group of the first bank sub-regions 206 of the second bank region 204B in the X-direction; and may partially (e.g., less than completely) horizontally overlap each of the group of the first bank sub-regions 206 of the first bank region 204A and the additional group of the first bank sub-regions 206 of the second bank region 204B in the Y-direction. In addition, the central sub-region 202A of the periphery circuitry region 202 may be horizontally interposed between the group of the second bank sub-regions 208 of the first bank region 204A and the additional group of the second bank sub-regions 208 of the second bank region 204B in the Y-direction; and may partially (e.g., less than completely) horizontally overlap each of the group of the second bank sub-regions 208 of the first bank region 204A and the additional group of the second bank sub-regions 208 of the second bank region 204B in the X-direction.

The second arm sub-region 202C of the periphery circuitry region 202 may be horizontally interposed between the group of the first bank sub-regions 206 of the first bank region 204A and the additional group of the second bank sub-regions 208 of the second bank region 204B in the Y-direction; and may overlap the group of the first bank sub-regions 206 of the first bank region 204A and the additional group of the second bank sub-regions 208 of the second bank region 204B in the X-direction. In addition, the first arm sub-region 202B of the periphery circuitry region 202 may be horizontally interposed between the additional group of the first bank sub-regions 206 of the second bank region 204B and the group of the second bank sub-regions 208 of the first bank region 204A in the Y-direction; and may overlap the additional group of the first bank sub-regions 206 of the second bank region 204B and the group of the second bank sub-regions 208 of the first bank region 204A in the X-direction.

The first bank sub-regions 206 and the second bank sub-regions 208 of the bank regions 204 (e.g., the first bank region 204A, the second bank region 204B) of the microelectronic device 100 may exhibit rectangular horizontal cross-sectional shapes. Each of the first bank sub-regions 206 may exhibit substantially the same rectangular horizontal cross-sectional shape as one another; and each of second bank sub-regions 208 may exhibit substantially the same rectangular horizontal cross-sectional shape as one another. The rectangular horizontal cross-sectional shape of each of the first bank sub-regions 206 may be different than the rectangular horizontal cross-sectional shape of each of the second bank sub-regions 208.

As shown in FIG. 2A, each of the first bank sub-regions 206 may have a fourth length $L_4$ in the Y-direction and a fourth width $W_4$ in the X-direction; and each of the second bank sub-regions 208 may have a fifth length $L_5$ in the Y-direction and a fifth width $W_5$ in the X-direction. The fourth length $L_4$ of each of the first bank sub-regions 206 may be greater than the fifth length $L_5$ of each of the second bank sub-regions 208. In some embodiments, the fourth length $L_4$ of each of the first bank sub-regions 206 is about two-times (2×) greater than the fifth length $L_5$ of each of the second bank sub-regions 208. In addition, the fourth width $W_4$ of each of the first bank sub-regions 206 may be less than the fifth width $W_5$ of each of the second bank sub-regions 208. In some embodiments, the fifth width $W_5$ of each of the second bank sub-regions 208 is about two-times (2×) greater than the fourth width $W_4$ of each of the first bank sub-regions 206.

The bank regions 204 (e.g., the first bank region 204A, the second bank region 204B) may individually include a desired quantity of the first bank sub-regions 206 and a desired quantity of the second bank sub-regions 208. As shown in FIG. 2A, in some embodiments, the first bank region 204A includes one (1) group of four (4) of the first bank sub-regions 206, and one (1) group of four (4) of the second bank sub-regions 208; and the second bank region 204B includes one (1) additional group of four (4) of the first bank sub-regions 206, and one (1) additional group of four (4) of the second bank sub-regions 208. In additional embodiments, one or more (e.g., each) of the first bank region 204A and the second bank region 204B includes a different quantity of first bank sub-regions 206 (e.g., greater than four (4) first bank sub-regions 206, less than four (4) first bank sub-regions 206) and/or a different quantity of second bank sub-regions 208 (e.g., greater than four (4) second bank sub-regions 208, less than four (4) second bank sub-regions 208). For an individual bank region 204, the quantity of first bank sub-regions 206 thereof may be substantially equal to the quantity of second bank sub-regions 208 thereof, or the quantity of first bank sub-regions 206 thereof may be different than (e.g., less than, greater than) the quantity of second bank sub-regions 208 thereof. In addition, the first bank region 204A and the second bank region 204B may have substantially the same quantity of first bank sub-regions 206 and substantially the same quantity of second bank sub-regions 208 as one another; or the first bank region 204A and the second bank region 204B may have different quantities of first bank sub-regions 206 than one another, and/or a different quantities of second bank sub-regions 208 than one another.

Referring next to FIG. 2B, an example arrangement of various circuitry of the control circuitry structure 200 within horizontal areas of the periphery circuitry region 202 and the bank regions 204 of the microelectronic device 100 is depicted. For ease and understanding of the drawings and related description not all features of the microelectronic device 100 previously described with reference to FIG. 2A are depicted in FIG. 2B. However, it will be understood that any features of the microelectronic device 100 described with reference to one or more of FIGS. 2A through 2E are applicable to one or more (e.g., all) others of FIGS. 2A through 2E.

As previously described herein, within a horizontal area of the periphery circuitry region 202 of the microelectronic device 100, the control circuitry structure 200 may contain relatively more speed-critical circuitry and devices. For example, within the horizontal area of the periphery circuitry region 202 of the microelectronic device 100, the control circuitry structure 200 may include, without limitation, a data I/O and control section 214, an internal clock and timing generator section 216, command and address (CA) section(s) 218, fuse section(s) 220, capacitor sections 222, voltage generator sections 224, analog sections 226, data junction sections 228, and package interface sections 230. The foregoing sections and an arrangement thereof within the horizontal area of the periphery circuitry region 202 of the microelectronic device 100 is described in further detail below.

The data I/O and control section 214 of the control circuitry structure 200 may include the data I/O and control circuitry 138 previously described with reference of the FIG. 1. By way of non-limiting example, the data I/O and control section 214 may include one or more (e.g., each) of read circuits, write circuits, write parallelize, read training control, input buffer circuits, input buffer latch circuits, DFE circuits, DIB circuits, DQ shift circuits, DQS circuits, DQS receiver path circuits, phase generator circuits, DCC circuits, DCRC circuits, clock and power control circuits, read control circuits, data serializer circuits, and data output buffer circuits. As shown in FIG. 2B, the data I/O and control section 214 may be positioned within a horizontal area of the central sub-region 202A of the periphery circuitry region 202 of the microelectronic device 100. The data I/O and control section 214 may be positioned proximate a horizontal center of the central sub-region 202A. In some embodiments, the data I/O and control section 214 is positioned proximate a horizontal center of the microelectronic device 100 defined by an intersection of the horizontal centerline 210, in the Y-direction, of the microelectronic device 100 and the additional horizontal centerline 212, in the X-direction, of the microelectronic device 100. Data I/O and control circuitry 138 (FIG. 1) within a first half (e.g., a half above the horizontal centerline 210) of the data I/O and control section 214 of the control circuitry structure 200 may be utilized for banks of memory cells of the memory array structure 300 (FIG. 2D) positioned within a horizontal area of the first bank region 204A of the microelectronic device 100; and data I/O and control circuitry 138 (FIG. 1) with a second half (e.g., a half below the horizontal centerline 210) of the data I/O and control section 214 of the control circuitry structure 200 may be utilized for additional banks of memory cells of the memory array structure 300 (FIG. 2D) positioned within a horizontal area of the second bank region 204B of the microelectronic device 100.

The internal clock and timing generator section 216 of the control circuitry structure 200 may include the internal clock and timing generator circuitry 136 previously described with reference of the FIG. 1. By way of non-limiting example, the internal clock and timing generator section 216 may include one or more (e.g., each) of DLL differential delay line and delay select logic circuits, DLL clock phase interpolator circuits, DLL output clock comparator circuits, DLL output circuits, DLL phase detectors circuits, DLL clock inversion control circuits, DLL control (coarse and fine control) logic circuits, DLL bias generator control circuits, DLL auto-reset block circuits, DLL enable logic circuits, bit line jitter circuits, and Ltree stage circuits. As shown in FIG. 2B, the internal clock and timing generator section 216 may also be positioned within the horizontal area of the central sub-region 202A of the periphery circuitry region 202 of the microelectronic device 100. The internal clock and timing generator section 216 may be positioned proximate the horizontal center of the central sub-region 202A. In some embodiments, the internal clock and timing generator section 216 is positioned proximate the horizontal center of the microelectronic device 100 defined by the intersection of the horizontal centerline 210, in the Y-direction, of the microelectronic device 100 and the additional horizontal centerline 212, in the X-direction, of the microelectronic device 100. The internal clock and timing generator section 216 may be offset from the data I/O and control section 214 in the X-direction. For example, the internal clock and timing generator section 216 may be horizontally positioned to one side of the additional horizontal centerline 212 in the X-direction of the microelectronic device 100, and the data I/O and control section 214 may be another side of the additional horizontal centerline 212 in the X-direction of the microelectronic device 100.

The CA section(s) 218 of the control circuitry structure 200 may include the CA input circuitry 115 and the CA decoder circuitry 124 previously described with reference of the FIG. 1. By way of non-limiting example, the CA section(s) 218 may include one or more (e.g., each) of column address buffer circuits, center drivers circuit, Eppr-Mode register circuits, Pcc control Wck circuits, Ecs control circuits, QED shifter circuits, Clkgen refresh circuits, column controller circuits, command extender circuits, Act_pre_cntl circuits, and BARArray timer circuits. As shown in FIG. 2B, the CA section(s) 218 may also be positioned within the horizontal area of the central sub-region 202A of the periphery circuitry region 202. As a non-limiting example, two (2) CA sections 218 may be positioned within the central sub-region 202A of the periphery circuitry region 202 at opposing horizontal boundaries of the internal clock and timing generator section 216 in the X-direction. One (1) of the CA sections 218 may be horizontally interposed in the X-direction between the data I/O and control section 214 and the internal clock and timing generator section 216; and another one (1) of the CA sections 218 may be horizontally interposed in the X-direction between the internal clock and timing generator section 216 and a fuse section 220. As another non-limiting example, the control circuitry structure 200 may include a single (e.g., only one) CA section 218 within the horizontal area of the central sub-region 202A of the periphery circuitry region 202 of the microelectronic device 100. The single CA section 218 may be positioned horizontally between the data I/O and control section 214 and the internal clock and timing generator section 216 in the X-direction, or may be positioned horizontally between the internal clock and timing generator section 216 and a fuse section 220 in the X-direction.

Still referring to FIG. 2B, the fuse section(s) 220 of the control circuitry structure 200 may include the fuse circuitry 132 (e.g., antifuse circuitry) previously described with reference of the FIG. 1. The fuse section(s) 220 may also be positioned within the horizontal area of the central sub-region 202A of the periphery circuitry region 202 of the microelectronic device 100. As a non-limiting example, two (2) fuse sections 220 may be positioned within the central sub-region 202A of the periphery circuitry region 202. One (1) of the fuse sections 220 may be positioned at or proximate a horizontal boundary of the data I/O and control section 214, and may be horizontally interposed in the X-direction between the data I/O and control section 214 and a first bank sub-region 206 of the first bank region 204A. Another one (1) of the fuse sections 220 may be positioned at or proximate a horizontal boundary of the one (1) of the CA sections 218 neighboring the internal clock and timing generator section 216, and may be horizontally interposed in the X-direction between the CA section 218 and a first bank sub-region 206 of the second bank region 204B. As another non-limiting example, the control circuitry structure 200 may include a single (e.g., only one) fuse section 220 within the horizontal area of the central sub-region 202A of the periphery circuitry region 202 of the microelectronic device 100. The single fuse section 220 may be positioned horizontally between the data I/O and control section 214 and a first bank sub-region 206 of the first bank region 204A in the X-direction, or may be positioned horizontally between one (1) of the CA sections 218 and a first bank sub-region 206 of the second bank region 204B in the X-direction.

The capacitor sections 222 of the control circuitry structure 200 may include circuitry (e.g., capacitors) configured and positioned to assist with powering various devices (e.g., control logic devices, access devices) of the microelectronic device 100. For example, the capacitor sections 222 may include capacitors for charge pumps, RC filters, peaking amplifiers, capacitors for AC coupling (e.g., RF amplifier capacitors), capacitors for DC blocking (e.g., DC blocking capacitors), and decoupling capacitors, and capacitors for powering one or more control logic devices, such as one or more of digital signal acquisition (DSA) devices, one or more ECC devices, one or more voltage generators (e.g., one or more low voltage generators, one or more high voltage generators), one or more command address devices, one or more capacitor structures (e.g., one or more decoupling capacitors), one or more data outputs (e.g., DQU, DQL), one or more command address devices, one or more antifuse devices, one or more DLL systems, one or more delay enable devices (e.g., one or more dQ enable delays devices), one or more temperature sensors, one or more data junctions for channeling data into and out of memory banks, and one or more additional control logic devices. Capacitors within the capacitor sections 222 of the control circuitry structure 200 may be coupled to back-end-of-line (BEOL) structures of the microelectronic device 100.

The capacitor sections 222 of the control circuitry structure 200 may also be positioned within the horizontal area of the central sub-region 202A of the periphery circuitry region 202 of the microelectronic device 100. As a non-limiting example, two (2) capacitor sections 222 may be positioned within the central sub-region 202A of the periphery circuitry region 202. One (1) of the capacitor sections 222 may be positioned at or proximate first horizontal boundaries, in the Y-direction, of the data I/O and control section 214, the internal clock and timing generator section 216, the CA section(s) 218, and the fuse section(s) 220. Another one (1) of the capacitor sections 222 may be positioned at or proximate second horizontal boundaries, in the Y-direction, of the data I/O and control section 214, the internal clock and timing generator section 216, the CA section(s) 218, and the fuse section(s) 220. The two (2) capacitor sections 222 may flank, in the Y-direction, the data I/O and control section 214, the internal clock and timing generator section 216, the CA section(s) 218, and the fuse section(s) 220. The capacitor sections 222 may individually horizontally overlap, in the X-direction, each of the data I/O and control section 214, the internal clock and timing generator section 216, the CA section(s) 218, and the fuse section(s) 220. The capacitor sections 222 may individually horizontal extend in the X-direction across at least a majority (e.g., greater than 50 percent, greater than or equal to 75 percent, greater than or equal to 90 percent, greater than or equal to 95 percent) of the central sub-region 202A of the periphery circuitry region 202.

Still referring to FIG. 2B, the voltage generator sections 224 of the control circuitry structure 200 may include the voltage generator circuitry 134 previously described with reference of the FIG. 1. The voltage generator sections 224 may also be positioned within the horizontal area of the central sub-region 202A of the periphery circuitry region 202 of the microelectronic device 100. As a non-limiting example, two (2) voltage generator sections 224 may be positioned within the central sub-region 202A of the periphery circuitry region 202. One (1) of the voltage generator sections 224 may be positioned at or proximate horizontal boundaries, in the Y-direction, of one (1) of the capacitor sections 222; and another one (1) of the voltage generator sections 224 may be positioned at or proximate horizontal boundaries, in the Y-direction, of another one (1) of the capacitor sections 222. The two (2) voltage generator sections 224 may flank, in the Y-direction, the two (2) capacitor sections 222. The voltage generator sections 224 may individually horizontally overlap, in the X-direction, the capacitor sections 222, as well as each of the data I/O and control section 214, the internal clock and timing generator section 216, the CA section(s) 218, and the fuse section(s) 220. The voltage generator sections 224 may individually horizontal extend in the X-direction across at least a majority (e.g., greater than 50 percent, greater than or equal to 75 percent, greater than or equal to 90 percent, greater than or equal to 95 percent) of the central sub-region 202A of the periphery circuitry region 202.

The analog sections 226 of the control circuitry structure 200 may include one or more of analog temperature dispense circuitry, and circuitry configured to act upon and/or generate analog voltage signals during use and operation of the microelectronic device 100. As a non-limiting example, the analog sections 226 may include one or more circuits (analog temperature dispense circuits) employing analog components to control one or more temperatures of the microelectronic device 100. Such a circuit may, for example, include a temperature sensor (e.g., a thermistor, a thermocouple), and an amplifier configured and positioned to amplify an output of the temperature sensor. The amplified signal may be employed to control one or more of a heating element and a cooling element to maintain a desired temperature of the microelectronic device 100. As another example, the analog sections 226 may include analog-to-digital conversion (ADC) devices and/or digital-to-analog conversion (DAC) devices in operable communication with the data I/O and control circuitry 138 previously described with reference of the FIG. 1 and memory cells of the microelectronic device 100.

The analog sections 226 of the control circuitry structure 200 may be positioned within the horizontal areas of the first and second arm sub-regions 202B, 202C of the periphery circuitry region 202 of the microelectronic device 100. For example, the periphery circuitry region 202 may include two (2) analog sections 226 within the horizontal area thereof, with one (1) of the analog sections 226 being positioned within the first arm sub-region 202B, and another one (1) of the analog sections 226 being positioned within the second arm sub-region 202C. The analog section 226 within the first arm sub-region 202B may horizontally overlap, in the X-direction, the first bank sub-regions 206 of the second bank region 204B; and the analog section 226 within the second arm sub-region 202C may horizontally overlap, in the X-direction, the first bank sub-regions 206 of the first bank region 204A. The analog section 226 within the first arm sub-region 202B may extend in the X-direction across at least a majority (e.g., greater than 50 percent, greater than or equal to 75 percent, greater than or equal to 90 percent, greater than or equal to 95 percent) of the first arm sub-region 202B; and the analog section 226 within the second arm sub-region 202C may extend in the X-direction across at least a majority (e.g., greater than 50 percent, greater than or equal to 75 percent, greater than or equal to 90 percent, greater than or equal to 95 percent) of the second arm sub-region 202C. In some embodiments, the analog sections 226 at least partially horizontally overlap, in the Y-direction, the capacitor sections 222 of the control circuitry structure 200 within the horizontal area of the central sub-region 202A of the periphery circuitry region 202 of the microelectronic device 100.

The data junction sections 228 of the control circuitry structure 200 may include multiplexer (MUX) circuitry configured and operated to select one of several input signals and then forward the selected input into a single line. For example, the package interface sections 230 may include row MUX circuitry configured and operated to selectively forward at least one row address signal from external devices to the row address decoder 106 (FIG. 1). As another example, the data junction sections 228 may include column MUX circuitry configured and operated to selectively forward at least one column address signal from external devices to the column address decoder 104 (FIG. 1). An another example, the data junction sections 228 may include other MUX circuitry configured and operated to receive digital data values generated by the I/O logic circuitry 112 (FIG. 1) and to generate a global data signal therefrom.

The data junction sections 228 of the control circuitry structure 200 may be positioned within the horizontal areas of the first and second arm sub-regions 202B, 202C of the periphery circuitry region 202 of the microelectronic device 100. For example, the periphery circuitry region 202 may include two (2) data junction sections 228 within the horizontal area thereof, with one (1) of the data junction sections 228 being positioned within the first arm sub-region 202B, and another one (1) of the data junction sections 228 being positioned within the second arm sub-region 202C. The data junction sections 228 may individually be horizontally interposed, in the Y-direction, between one of the analog section 226 of the control circuitry structure 200 and one of the bank regions 204 of the microelectronic device 100. For example, the data junction section 228 within the first arm sub-region 202B may be horizontally interposed, in the Y-direction, between the analog section 226 within the first arm sub-region 202B and the second bank sub-regions 208 of the first bank region 204A; and the data junction section 228 within the second arm sub-region 202C may be horizontally interposed, in the Y-direction, between the analog section 226 within the second arm sub-region 202C and the second bank sub-regions 208 of the second bank region 204B. The data junction section 228 within the first arm sub-region 202B may horizontally overlap, in the X-direction, the first bank sub-regions 206 of the second bank region 204B; and the data junction section 228 within the second arm sub-region 202C may horizontally overlap, in the X-direction, the first bank sub-regions 206 of the first bank region 204A. The data junction section 228 within the first arm sub-region 202B may extend in the X-direction across at least a majority (e.g., greater than 50 percent, greater than or equal to 75 percent, greater than or equal to 90 percent, greater than or equal to 95 percent) of the first arm sub-region 202B; and the data junction section 228 within the second arm sub-region 202C may extend in the X-direction across at least a majority (e.g., greater than 50 percent, greater than or equal to 75 percent, greater than or equal to 90 percent, greater than or equal to 95 percent) of the second arm sub-region 202C. In some embodiments, the data junction section 228 at least partially horizontally overlap, in the Y-direction, the voltage generator sections 224 of the control circuitry structure 200 within the horizontal area of the central sub-region 202A of the periphery circuitry region 202 of the microelectronic device 100.

The package interface sections 230 of the control circuitry structure 200 includes structures and circuitry configured to facilitate electrical communication between the microelectronic device 100 and a relatively larger device package including the microelectronic device 100. For example, the package interface sections 230 may include BEOL structures (e.g., pad structures, such as bond pads; conductive routing) in electrical communication with circuitry of microelectronic device 100 and configured to interface with additional structures (e.g., wiring) in electrical communications with circuitry external to the microelectronic device 100.

The package interface sections 230 of the control circuitry structure 200 may be positioned within the horizontal areas of the first and second arm sub-regions 202B, 202C of the periphery circuitry region 202 of the microelectronic device 100. For example, the periphery circuitry region 202 may include two (2) package interface sections 230 within the horizontal area thereof, with one (1) of the package interface sections 230 being positioned within the first arm sub-region 202B, and another one (1) of the package interface sections 230 being positioned within the second arm sub-region 202C. The package interface sections 230 may individually be horizontally interposed, in the Y-direction, between one of the analog section 226 and one of the bank regions 204. For example, the package interface section 230 within the first arm sub-region 202B may be horizontally interposed, in the Y-direction, between the analog section 226 within the first arm sub-region 202B and the first bank sub-regions 206 of the second bank region 204B; and the package interface section 230 within the second arm sub-region 202C may be horizontally interposed, in the Y-direction, between the analog section 226 within the second arm sub-region 202C and the first bank sub-regions 206 of the first bank region 204A. The package interface section 230 within the first arm sub-region 202B may horizontally overlap, in the X-direction, the first bank sub-regions 206 of the second bank region 204B; and the package interface section 230 within the second arm sub-region 202C may horizontally overlap, in the X-direction, the first bank sub-regions 206 of the first bank region 204A. The package interface section 230 within the first arm sub-region 202B may extend in the X-direction across at least a majority (e.g., greater than 50 percent, greater than or equal to 75 percent, greater than or equal to 90 percent, greater than or equal to 95 percent) of the first arm sub-region 202B; and the package interface section 230 within the second arm sub-region 202C may extend in the X-direction across at least a majority (e.g., greater than 50 percent, greater than or equal to 75 percent, greater than or equal to 90 percent, greater than or equal to 95 percent) of the second arm sub-region 202C.

Within the horizontal area of an individual first bank sub-region 206 of the microelectronic device 100, the control circuitry structure 200 may include a transistor array section 232, a row decoder section 234, column decoder sections 236, a control logic device section 238, and a bank logic section 240. Within an individual first bank sub-region 206, the row decoder section 234 may be horizontally neighbor, in the X-direction, the transistor array section 232. Row decoder sections 234 within some groups of two (2) of the first bank sub-regions 206 horizontally neighboring one another in the X-direction may be positioned proximate (e.g., substantially "back-to-back" to) one another in the X-direction, such that the transistor array sections 232 of the some groups of two (2) of the first bank sub-region 206 are not horizontally interposed between the row decoder sections 234 in the X-direction. Row decoder sections 234 within some other groups of two (2) of the first bank sub-regions 206 horizontally neighboring one another in the X-direction may be positioned relatively more distal from one another in the X-direction, such that the transistor array sections 232 of the some other groups of two (2) of the first bank sub-region 206 are horizontally interposed between the row decoder sections 234 in the X-direction. In addition, within an individual first bank sub-region 206, the transistor array section 232 and the row decoder section 234 may be horizontally interposed, in the Y-direction, between a first of the column decoder sections 236 and a second of the column decoder sections 236. The first of the column decoder sections 236 may be positioned at or proximate a first end of the transistor array section 232 in the Y-direction, and the second of the column decoder sections 236 may be positioned at or proximate a second end of the transistor array section 232 in the Y-direction. The second of the column decoder sections 236 may be horizontally interposed, in the Y-direction, between the control logic device section 238 and each of the transistor array sections 232 and the row decoder section 234. Furthermore, the control logic device section 238 may be horizontally interposed, in the Y-direction, between the column decoder section 236 and the bank logic section 240; and the bank logic section 240 may be horizontally interposed, in the Y-direction, between the control logic device section 238 and one (1) of the first and second arm sub-regions 202B, 202C of the periphery circuitry region 202 of the microelectronic device 100.

The transistor array section 232 of the control circuitry structure 200 within the horizontal area an individual first bank sub-region 206 of the microelectronic device 100 may include multiple patch sub-sections of the microelectronic device 100 within a horizontal area thereof. Within the horizontal area of an individual patch sub-section, the control circuitry structure 200 may include various control logic circuitry (e.g., sense amplifier (SA) circuitry; decoder circuitry, such as column decoder circuitry; word line driver circuitry, such as main word line driver (MWD) circuitry and sub-word line driver (SWD) circuitry). A non-limiting example of a configuration of the control circuitry structure 200 within the horizontal area of an individual patch sub-section of the microelectronic device 100 is described in further detail below with reference to FIG. 2C.

The row decoder section 234 of the control circuitry structure 200 within the horizontal area an individual first bank sub-region 206 of the microelectronic device 100 may include row decoder circuitry configured for effectuating at least some row operations on a bank of memory cells within the memory array structure 300 (FIG. 2D) underlying the control circuitry structure 200. The bank of memory cells may be located within the horizontal area of the first bank sub-region 206 of the microelectronic device 100, as described in further detail below with reference to FIG. 2D. As shown in FIG. 2B, the row decoder section 234 within the first bank sub-region 206 may horizontally extend, in the Y-direction, across at least a majority (e.g., greater than 50 percent, greater than or equal to 75 percent, greater than or equal to 90 percent, greater than or equal to 95 percent) of each of the transistor array sections 232 of the first bank sub-region 206. The horizontal position, in the X-direction, of the row decoder section 234 within each first bank sub-region 206 may facilitate main word line (MWL) lengths, in the X-direction, within each first bank sub-region 206 that are substantially equal to MWL lengths, in the X-direction, within each second bank sub-region 208 (described in further detail below). Consistent MWL lengths within the first bank sub-regions 206 and the second bank sub-regions 208 may facilitate, without limitation, driver sizing consistency, RC consistency, and timing consistency for the first bank sub-regions 206 and the second bank sub-regions 208 even though the first bank sub-regions 206 have different horizontal geometric configurations (e.g., different horizontal dimensions in the X-direction and the Y-direction) than the second bank sub-regions 208.

The column decoder sections 236 of the control circuitry structure 200 within the horizontal area an individual first bank sub-region 206 of the microelectronic device 100 may individually include column decoder circuitry configured for effectuating at least some column operations on a bank of memory cells within the memory array structure 300 (FIG. 2D) underlying the control circuitry structure 200. As shown in FIG. 2B, the column decoder sections 236 within the first bank sub-region 206 may be horizontally positioned, in the Y-direction, at or proximate opposing horizontal ends of the transistor array section 232 and the row decoder section 234. Each first bank sub-region 206 may include two (2) column decoder sections 236. One (1) of the two (2) column decoder sections 236 may be positioned at or proximate first horizontal ends, in the Y-direction, of the transistor array section 232 and the row decoder section 234; and one (1) other of the two (2) column decoder sections 236 may be positioned at or proximate second horizontal ends, in the Y-direction, of the transistor array section 232 and the row decoder section 234. The column decoder sections 236 may individually horizontally extend, in the X-direction, across at least a majority (e.g., greater than 50 percent, greater than or equal to 75 percent, greater than or equal to 90 percent, greater than or equal to 95 percent) of an overall horizontal dimension (e.g., overall width in the X-direction) of a combination of the transistor array section 232 and the row decoder section 234 within the first bank sub-region 206. The quantity and horizontal positions, in the Y-direction, of the column decoder sections 236 within each first bank sub-region 206 may facilitate column select (CS) line lengths and main input/output (MIO) line lengths, in the Y-direction, within each first bank sub-region 206 that are substantially equal to CS line lengths and MIO line lengths, in the Y-direction, within each second bank sub-region 208. Consistent CS line lengths and consistent MIO line lengths within the first bank sub-regions 206 and the second bank sub-regions 208 may facilitate, without limitation, driver sizing consistency, RC consistency, and timing consistency within the first bank sub-regions 206 and the second bank sub-regions 208 even though the first bank sub-regions 206 have different horizontal geometric configurations (e.g., different horizontal dimensions in the X-direction and the Y-direction) than the second bank sub-regions 208.

The control logic device section 238 of the control circuitry structure 200 within the horizontal area an individual first bank sub-region 206 of the microelectronic device 100 may include various control logic circuitry for the microelectronic device 100 including, without limitation, DSA circuitry and ECC circuitry. In some embodiments, the control logic device section 238 within an individual first bank sub-region 206 includes both ECC circuitry and DSA circuitry for associated operations on a bank of memory cells within the memory array structure 300 (FIG. 2D) underlying the control circuitry structure 200. The bank of memory cells may be located within the horizontal area of the first bank sub-region 206 of the microelectronic device 100. In additional embodiments, the control logic device section 238 includes additional control logic circuitry, such as one or more of repair circuitry (e.g., column repair circuitry, row repair circuitry), I/O devices (e.g., local I/O devices), test devices, MUX devices, self-refresh/wear leveling devices, redundancy fuses and logic (DFM) devices, and DFT devices. As shown in FIG. 2B, the control logic device section 238 within the horizontal area of an individual first bank sub-region 206 may be horizontally positioned, in the Y-direction, at or proximate a horizontal end of one of the column decoder sections 236. The control logic device section 238 may horizontally extend, in the X-direction, across at least a majority (e.g., greater than 50 percent, greater than or equal to 75 percent, greater than or equal to 90 percent, greater than or equal to 95 percent) of the column decoder section 236.

The bank logic section 240 of the control circuitry structure 200 within the horizontal area an individual first bank sub-region 206 of the microelectronic device 100 may include additional control logic circuitry for effectuating operation of the control logic circuitry of the transistor array sections 232, the row decoder section 234, and the column decoder section 236 within the first bank sub-region 206. As shown in FIG. 2B, the bank logic section 240 within the first bank sub-region 206 may be horizontally positioned, in the Y-direction, at or proximate a horizontal end of the control logic device section 238. The bank logic section 240 may horizontally extend, in the X-direction, across at least a majority (e.g., greater than 50 percent, greater than or equal to 75 percent, greater than or equal to 90 percent, greater than or equal to 95 percent) of the control logic device section 238 (and, hence, the column decoder section 236).

Still referring to FIG. 2B, within the horizontal area of an individual second bank sub-region 208 of the microelectronic device 100, the control circuitry structure 200 may include additional transistor array sections 242, an additional row decoder section 244, an additional column decoder section 246, an additional control logic device section 248, and an additional bank logic section 250. Within an individual second bank sub-region 208, the additional row decoder section 244 may be horizontally interposed, in the X-direction, between two (2) additional transistor array sections 242. In addition, within an individual second bank sub-region 208, the additional column decoder section 246 may be horizontally interposed, in the Y-direction, between the additional control logic device section 248 and each of the additional transistor array sections 242 and the additional row decoder section 244; the additional control logic device section 248 may be horizontally interposed, in the Y-direction, between the additional column decoder section 246 and the additional bank logic section 250; and the additional bank logic section 250 may be horizontally interposed, in the Y-direction, between the additional control logic device section 248 and one (1) of the first and second arm sub-regions 202B, 202C of the periphery circuitry region 202 of the microelectronic device 100.

The additional transistor array sections 242 of the control circuitry structure 200 within the horizontal area of an individual second bank sub-region 208 of the microelectronic device 100 may include a first additional transistor array section 242A, and a second additional transistor array section 242B horizontally offset from the first additional transistor array section 242A in the X-direction. The first additional transistor array section 242A and the second additional transistor array section 242B may exhibit substantially the same horizontal dimensions (e.g., length in the Y-direction, width in the X-direction) as one another, and substantially the same horizontal cross-sectional shape as one another. A length (e.g., first horizontal dimension) in the Y-direction of each of the additional transistor array sections 242 of an individual second bank sub-region 208 may be relatively smaller than a length (e.g., first horizontal dimension) in the Y-direction of the transistor array section 232 within the horizontal area of an individual first bank sub-region 206. In some embodiments, each of the additional transistor array sections 242 has a length in the Y-direction that is less than or equal to about one-half (½) of a length in the Y-direction of the transistor array section 232. In addition, a width (e.g., second horizontal dimension) in the X-direction of each of the additional transistor array sections 242 of an individual second bank sub-region 208 may be substantially equal to a width (e.g., second horizontal dimension) in the X-direction of the transistor array section 232 within the horizontal area of an individual first bank sub-region 206. The additional transistor array sections 242 may individually include multiple patch sub-sections of the microelectronic device 100 within a horizontal area thereof. As previously mentioned, within the horizontal area of an individual patch sub-section, the control circuitry structure 200 may include various control logic circuitry (e.g., SA circuitry; decoder circuitry, such as column decoder circuitry; word line driver circuitry, such as MWD circuitry and SWD circuitry). A non-limiting example of a configuration of the control circuitry structure 200 within the horizontal area of an individual patch sub-section of the microelectronic device 100 is described in further detail below with reference to FIG. 2C. In some embodiments, an individual additional transistor array section 242 within an individual second bank sub-region 208 has about one-half (½) as many patch sub-sections in the Y-direction as the transistor array section 232 within an individual first bank sub-region 206, and about the same quantity of patch sub-sections in the X-direction as the transistor array section 232 within the first bank sub-region 206.

The additional row decoder section 244 within the horizontal area an individual second bank sub-region 208 of the microelectronic device 100 may include additional row decoder circuitry configured for effectuating at least some row operations on an additional bank of memory cells within the memory array structure 300 (FIG. 2D) underlying the control circuitry structure 200. The additional bank of memory cells may be located within the horizontal area of the second bank sub-region 208 of the microelectronic device 100, as described in further detail below with reference to FIG. 2D. In some embodiments, the additional row decoder section 244 within an individual second bank sub-region 208 has a length (e.g., first horizontal dimension) in the Y-direction that is less than or equal to about one-half (½) of a length (e.g., first horizontal dimension) in the Y-direction of the row decoder section 234 within one (1) of the first bank sub-regions 206. As shown in FIG. 2B, the additional row decoder section 244 within an individual second bank sub-region 208 may horizontally extend, in the Y-direction, across at least a majority (e.g., greater than 50 percent, greater than or equal to 75 percent, greater than or equal to 90 percent, greater than or equal to 95 percent) of each of the additional transistor array sections 242 of the second bank sub-region 208.

The additional column decoder section 246 within the horizontal area an individual second bank sub-region 208 of the microelectronic device 100 may include additional column decoder circuitry configured for effectuating at least some column operations on an additional bank of memory cells within the memory array structure 300 (FIG. 2D) underlying the control circuitry structure 200. In some embodiments, the additional column decoder section 246 within an individual second bank sub-region 208 has a width (e.g., second horizontal dimension) in the X-direction that is greater than or equal to about two-times (2) of a width (e.g., second horizontal dimension) in the X-direction of one (1) of the column decoder sections 236 within one (1) of the first bank sub-regions 206. As shown in FIG. 2B, the additional column decoder section 246 within an individual bank sub-region 208 may be horizontally positioned, in the Y-direction, at or proximate horizontal ends of the additional transistor array sections 242 and the additional row decoder section 244. The additional column decoder section 246 may horizontally extend, in the X-direction, across at least a majority (e.g., greater than 50 percent, greater than or equal to 75 percent, greater than or equal to 90 percent, greater than or equal to 95 percent) of an overall horizontal dimension (e.g., overall width in the X-direction) of a combination of the additional transistor array sections 242 and the additional row decoder section 244 within the second bank sub-region 208.

The additional control logic device section 248 within the horizontal area an individual second bank sub-region 208 of the microelectronic device 100 may include various control logic circuitry for the microelectronic device 100 including, without limitation, the control logic circuitry previously described herein in relation to the control logic device section 238 within an individual first bank sub-region 206. In some embodiments, the additional control logic device section 248 within an individual second bank sub-region 208 includes at least one ECC device and at least one DSA device for associated operations on an additional bank of memory cells within the memory array structure 300 (FIG. 2D) underlying the control circuitry structure 200. The additional bank of memory cells may be located within the horizontal area of the second bank sub-region 208. The additional control logic device section 248 within an individual second bank sub-region 208 may have a width (e.g., second horizontal dimension) in the X-direction that is greater than or equal to about two-times (2) of a width (e.g., second horizontal dimension) in the X-direction of the control logic device section 238 of one (1) of the first bank sub-regions 206. As shown in FIG. 2B, the additional control logic device section 248 within an individual second bank sub-region 208 may be horizontally positioned, in the Y-direction, at or proximate a horizontal end of the additional column decoder section 246. The additional control logic device section 248 may horizontally extend, in the X-direction, across at least a majority (e.g., greater than 50 percent, greater than or equal to 75 percent, greater than or equal to 90 percent, greater than or equal to 95 percent) of the additional column decoder section 246.

The additional bank logic section 250 within the horizontal area an individual second bank sub-region 208 of the microelectronic device 100 may include additional control logic circuitry for effectuating operation of the control logic circuitry of the additional transistor array sections 242, the additional row decoder section 244, and the additional column decoder section 246 of the first bank sub-region 206. The additional bank logic section 250 within an individual second bank sub-region 208 may have a width (e.g., second horizontal dimension) in the X-direction that is greater than or equal to about two-times (2) of a width (e.g., second horizontal dimension) in the X-direction of the bank logic section 240 of one (1) of the first bank sub-regions 206. As shown in FIG. 2B, the additional bank logic section 250 within an individual second bank sub-region 208 may be horizontally positioned, in the Y-direction, at or proximate a horizontal end of the additional control logic device section 248. The additional bank logic section 250 may horizontally extend, in the X-direction, across at least a majority (e.g., greater than 50 percent, greater than or equal to 75 percent, greater than or equal to 90 percent, greater than or equal to 95 percent) of the additional control logic device section 248 (and, hence, the additional column decoder section 246).

As previously mentioned, FIG. 2C is a simplified, schematic view of a portion A (illustrated with a dashed box in FIG. 2B) of the control circuitry structure 200 of the microelectronic device 100, in accordance with embodiments of the disclosure. The portion A illustrates a configuration of the control circuitry structure 200 within a horizontal area of a patch sub-section 252 of the microelectronic device 100. The patch sub-section 252 may be positioned within a horizontal area of one (1) of the second bank sub-regions 208 of one of the bank regions 204 (e.g., the first bank region 204A) of the control circuitry structure 200. Each of the second bank sub-regions 208 (FIG. 2B) of the control circuitry structure 200 may include multiple (e.g., a group, a plurality) of patch sub-sections 252 within a horizontal area thereof, and the control circuitry structure 200 may exhibit a similar configuration as that shown in FIG. 2C within a horizontal area of each patch sub-section 252. In addition, within a horizontal area of an individual first bank sub-region 206 (FIG. 2B) of the microelectronic device 100, the control circuitry structure 200 may include multiple (e.g., a group, a plurality) of the patch sub-sections 252, and the control circuitry structure 200 may exhibit a similar configuration as that shown in FIG. 2C within the horizontal area of each patch sub-section 252.

Within a horizontal area of each patch sub-section 252 of the microelectronic device 100, the control circuitry structure 200 is substantially free of memory cells. Instead, memory cells of the microelectronic device 100 are contained (e.g., confined) within the memory array structure 300 (FIG. 2D) of the microelectronic device 100 vertically offset from (e.g., vertically underlying) the control circuitry structure 200.

Each patch sub-section 252 of the microelectronic device 100 may include array regions 254, digit line exit regions 256 (also referred to as "digit line contact socket regions") interposed between pairs of the array regions 254 horizontally neighboring one another in the Y-direction, word line exit regions 258 (also referred to as "word line contact socket regions") interposed between additional pairs of the array regions 254 horizontally neighboring one another in the X-direction orthogonal to the Y-direction. The array regions 254, the digit line exit regions 256, and the word line exit regions 258 within individual patch sub-sections 252 of the microelectronic device 100 are described in further detail below.

The array regions 254 of the microelectronic device 100 may comprise horizontal areas of the microelectronic device 100 having arrays of memory cells (e.g., arrays of DRAM cells) within horizontal boundaries thereof. The arrays of memory cells may be vertically positioned within the memory array structure 300 (FIG. 2D) of the microelectronic device 100. In addition, the array regions 254 may also have desirable arrangements of control logic devices within horizontal boundaries thereof. The control logic devices may be vertically positioned to be formed within the horizontal boundaries of the array regions 254 within the control circuitry structure 200 (FIG. 2B) of the microelectronic device 100.

An individual patch sub-section 252 of the microelectronic device 100 may be formed to include a desired quantity of the array regions 254. For clarity and ease of understanding of the drawings and related description, FIG. 2C depicts an individual patch sub-section 252 as including four (4) array regions 254: a first array region 254A, a second array region 254B, a third array region 254C, and a fourth array region 254D. As shown in FIG. 2C, the second array region 254B may horizontally neighbor the first array region 254A in the Y-direction, and may horizontally neighbor the fourth array region 254D in the X-direction; the third array region 254C may horizontally neighbor the first array region 254A in the X-direction, and may horizontally neighbor the fourth array region 254D in the Y-direction; and the fourth array region 254D may horizontally neighbor the third array region 254C in the Y-direction, and may horizontally neighboring the second array region 254B in the Y-direction. In additional embodiments, an individual patch sub-section 252 includes a different number of array regions 254. For example, the patch sub-section 252 may include greater than four (4) array regions 254, or less than four (4) array regions 254.

In addition, an individual patch sub-section 252 of the microelectronic device 100 may include a desired distribution of the array regions 254. As shown in FIG. 2C, in some embodiments, the microelectronic device 100 is formed to include rows of the array regions 254 extending in the X-direction, and columns of the array regions 254 extending in the Y-direction. The rows of the array regions 254 may, for example, include a first row including the first array region 254A and the third array region 254C, and a second row including the second array region 254B and the fourth array region 254D. The columns of the array regions 254 may, for example, include a first column including the first array region 254A and the second array region 254B, and a second column including the third array region 254C and the fourth array region 254D.

With continued reference to FIG. 2C, the digit line exit regions 256 of the microelectronic device 100 may comprise horizontal areas of the microelectronic device 100 configured and positioned to have at least some digit lines (e.g., bit lines, data lines) horizontally terminate therein. For an individual digit line exit region 256, at least some formed digit lines operatively associated with the array regions 254 flanking (e.g., at opposing boundaries in the Y-direction) the digit line exit region 256 may have ends within the horizontal boundaries of the digit line exit region 256. In addition, the digit line exit regions 256 may also be configured and positioned to include contact structures and routing structures with the horizontal boundaries thereof that are operatively associated with at least some of the digit lines. Some of the contact structures within the digit line exit regions 256 may couple the digit lines to control logic circuitry of control logic devices (e.g., SA devices) within horizontal areas the array regions 254. As shown in FIG. 2C, in some embodiments, the digit line exit regions 256 horizontally extend in the X-direction, and are horizontally interposed between horizontally neighboring rows of the array regions 254 in the Y-direction. The digit line exit regions 256 may, for example, horizontally alternate with the rows of the array regions 254 in the Y-direction.

An individual digit line exit region 256 may be divided into multiple sub-regions. For example, as shown in FIG. 1, an individual digit line exit region 256 may include first digit line exit sub-regions 256A and second digit line exit sub-regions 256B. In some embodiments, the first digit line exit sub-regions 256A horizontally alternate with the second digit line exit sub-regions 256B in the X-direction. A pair (e.g., two (2)) of horizontally neighboring array regions 254 within an individual column of the array regions 254 may include one (1) of the first digit line exit sub-regions 256A and one (1) of the second digit line exit sub-regions 256B positioned horizontally therebetween in the Y-direction. By way of non-limiting example, the first array region 254A and the second array region 254B of a first column of the array regions 254 may include one (1) of the first digit line exit sub-regions 256A and one (1) of the second digit line exit sub-regions 256B positioned therebetween in the Y-direction. The one (1) of the first digit line exit sub-regions 256A and the one (1) of the second digit line exit sub-regions 256B may be at least partially (e.g., substantially) confined with horizontal boundaries in the X-direction of the first array region 254A and the second array region 254B.

An individual first digit line exit sub-region 256A may be configured and positioned to facilitate electrical connections between a group of digit lines (e.g., odd digit lines or even digit lines) within the memory array structure 300 (FIG. 2D) and a group of control logic devices (e.g., odd SA devices or even SA devices) within the control circuitry structure 200 (FIG. 2B) operatively associated with a portion (e.g., a half portion in the X-direction) of one (1) array region 254 (e.g., the first array region 254A) of a pair of horizontally neighboring array regions 254. The first digit line exit sub-region 256A may also be configured and positioned to facilitate electrical connections between a group of additional digit lines (e.g., additional odd digit lines or additional even digit lines) within the memory array structure 300 (FIG. 2D) and a group of additional control logic devices (e.g., additional odd SA devices or additional even SA devices) within the control circuitry structure 200 (FIG. 2B) operatively associated with a corresponding portion (e.g., a corresponding half portion in the X-direction) of an additional array region 254 (e.g., the second array region 254B) of the pair of horizontally neighboring array regions 254. In addition, an individual second digit line exit sub-region 256B may be configured and positioned to facilitate electrical connections between a group of further digit lines within the memory array structure 300 (FIG. 2D) and a group of further control logic devices within the control circuitry structure 200 (FIG. 2B) operatively associated with another portion (e.g., another half portion in the X-direction) of the one (1) array region 254 (e.g., the first array region 254A). The second digit line exit sub-region 256B may also be configured and positioned and to also facilitate electrical connections between a group of yet further digit lines within the memory array structure 300 (FIG. 2D) and a group of yet further control logic devices within the control circuitry structure 200 (FIG. 2B) operatively associated with a corresponding another portion (e.g., a corresponding another half portion in the X-direction) of the additional array region 254 (e.g., the second array region 254B).

Still referring to FIG. 2C, the word line exit regions 258 of the microelectronic device 100 may comprise horizontal areas of the microelectronic device 100 configured and positioned to have at least some word lines (e.g., access lines) horizontally terminate therein. For an individual word line exit region 258, at least some word lines operatively associated with the array regions 254 flanking (e.g., at opposing boundaries in the X-direction) the word line exit region 258 may have ends within the horizontal boundaries of the word line exit region 258. In addition, the word line exit regions 258 may also be configured and positioned to include contact structures and routing structures within the horizontal boundaries thereof that are operatively associated with the word lines. Some of the contact structures within the word line exit regions 258 may couple the word lines to control logic circuitry of additional control logic devices (e.g., SWD devices) to within horizontal areas the array regions 254. As shown in FIG. 2C, in some embodiments, the word line exit regions 258 horizontally extend in the Y-direction, and are horizontally interposed between horizontally neighboring columns of the array regions 254 in the X-direction. The word line exit regions 258 may, for example, horizontally alternate with the columns of the array regions 254 in the X-direction.

An individual word line exit region 258 may be divided into multiple sub-regions. For example, as shown in FIG. 1, an individual word line exit region 258 may include first word line exit sub-regions 258A and second word line exit sub-regions 258B. In some embodiments, the first word line exit sub-regions 258A horizontally alternate with the second word line exit sub-regions 258B in the Y-direction. A pair (e.g., two (2)) of horizontally neighboring array regions 254 within an individual row of the array regions 254 may include one (1) of the first word line exit sub-regions 258A and one (1) of the second word line exit sub-regions 258B positioned horizontally therebetween in the X-direction. By way of non-limiting example, the first array region 254A and the third array region 254C of a first row of the array regions 254 may include one (1) of the first word line exit sub-regions 258A and one (1) of the second word line exit sub-regions 258B positioned therebetween in the X-direction. The one (1) of the first word line exit sub-regions 258A and the one (1) of the second word line exit sub-regions 258B may be at least partially (e.g., substantially) confined with horizontal boundaries in the Y-direction of the first array region 254A and the third array region 254C.

An individual first word line exit sub-region 258A may be configured and positioned to facilitate electrical connections between a group of word lines (e.g., odd word lines or even word lines) within the memory array structure 300 (FIG. 2D) and a group of control logic devices (e.g., odd SWD devices or even SWD devices) within the control circuitry structure 200 (FIG. 2B) operatively associated with a portion (e.g., a half portion in the Y-direction) of one (1) array region 254 (e.g., the first array region 254A) of a pair of horizontally neighboring array regions 254. The first word line exit sub-region 258A may also facilitate electrical connections between a group of additional word lines (e.g., additional odd word lines or additional even word lines) within the memory array structure 300 (FIG. 2D) and a group of additional control logic devices (e.g., additional odd SWD devices or additional even SWD devices) within the control circuitry structure 200 (FIG. 2B) operatively associated with a corresponding portion (e.g., a corresponding half portion in the Y-direction) of a further array region 254 (e.g., the third array region 254C) of the pair of horizontally neighboring array regions 254. In addition, an individual second word line exit sub-region 258B may be configured and positioned to facilitate electrical connections between a group of further word lines within the memory array structure 300 (FIG. 2D) and a group of further control logic devices within the control circuitry structure 200 (FIG. 2B) operatively associated with another portion (e.g., another half portion in the Y-direction) of the one (1) array region 254 (e.g., the first array region 254A). The second word line exit sub-region 258B may also facilitate electrical connections between a group of yet further word lines within the memory array structure 300 (FIG. 2D) and a group of yet further control logic devices within the control circuitry structure 200 (FIG. 2B) operatively associated with a corresponding another portion (e.g., a corresponding another half portion in the Y-direction) of the further array region 254 (e.g., the third array region 254C).

Still referring to FIG. 2C, the control circuitry structure 200 of the microelectronic device 100 may include a desired arrangement of SA sections 260 and SWD sections 262 within a horizontal area of each array region 254 of an individual patch sub-section 252 of the microelectronic device 100. The SA sections 260 of the control circuitry structure 200 may individually include SA devices coupled to digit lines positioned within the memory array structure 300 (FIG. 2D) of the microelectronic device 100. The digit lines may vertically underlie (e.g., in the Z-direction) the SA devices of the SA sections 260 of the control circuitry structure 200. The SWD sections 262 may include SWD devices coupled to the word lines positioned within the memory array structure 300 (FIG. 2D) of the microelectronic device 100. The word lines may vertically underlie (e.g., in the Z-direction) the SWD devices of the SWD sections 262 of the control circuitry structure 200.

The SA sections 260 within a horizontal area an individual array region 254 (e.g., the first array region 254A, the second array region 254B, the third array region 254C, or the fourth array region 254D) of the microelectronic device 100 may include a first SA section 260A and a second SA section 260B. An individual first SA section 260A and an individual second SA section 260B of the control circuitry structure 200 within a horizontal area an individual array region 254 of the microelectronic device 100 may be positioned at or proximate opposite corners (e.g., diagonally opposite corners) of the array region 254 than one another. For example, as shown in FIG. 2C, for an individual array region 254, the first SA section 260A may be positioned at or proximate a first corner 264A of the array region 254, and the second SA section 260B may be positioned at or proximate a second corner 264B of the array region 254 located diagonally opposite (e.g., kitty-corner) the first corner 264A.

For each SA section 260 (e.g., the first SA section 260A, the second SA section 260B) of the control circuitry structure 200 within a horizontal area of an individual array region 254 of the microelectronic device 100, the SA devices of the SA section 260 may be coupled to a group of the digit lines within the memory array structure 300 (FIG. 2D) that horizontally extends (e.g., in the Y-direction) through the array region 254 by way of digit line routing and contact structures 266.

For an individual patch sub-section 252 of the microelectronic device 100, the SA devices of the SA sections 260 of the control circuitry structure 200 within array regions 254 horizontally neighboring one another in the Y-direction (e.g., the first array region 254A and the second array region 254B; the third array region 254C and the fourth array region 254D) may be coupled to different groups of digit lines than one another. For example, each of the SA sections 260 (e.g., each of the first SA section 260A and the second SA section 260B) of the control circuitry structure 200 within the first array region 254A may include so-called "even" SA devices coupled to even digit lines within the memory array structure 300 (FIG. 2D) by way of the digit line routing and contact structures 266 associated with the SA sections 260; and each of the SA sections 260 (e.g., each of the first SA section 260A and the second SA section 260B) of the control circuitry structure 200 within the second array region 254B may include so-called "odd" SA devices coupled to odd digit lines within the memory array structure 300 (FIG. 2D) by way of the digit line routing and contact structures 266 associated with the SA sections 260;

or vice versa. The even digit lines of the memory array structure 300 (FIG. 2D) may horizontally alternate with the odd digit lines of the memory array structure 300 (FIG. 2D) in the X-direction. The SA devices of each of the SA sections 260 of the control circuitry structure 200 within horizontal area of the first array region 254A may not be coupled to any odd digit lines of the memory array structure 300 (FIG. 2D); and the SA devices of each of the SA sections 260 of the control circuitry structure 200 within the horizontal area of the second array region 254B may not be coupled to any even digit lines of the memory array structure 300 (FIG. 2D); or vice versa. Similarly, each of the SA sections 260 (e.g., each of the first SA section 260A and the second SA section 260B) of the control circuitry structure 200 within the third array region 254C horizontally neighboring the first array region 254A in the X-direction may include additional even SA devices coupled to additional even digit lines within the memory array structure 300 (FIG. 2D) by way of the digit line routing and contact structures 266 associated with the SA sections 260; and each of the SA sections 260 (e.g., each of the first SA section 260A and the second SA section 260B) of the control circuitry structure 200 within the horizontal area of the fourth array region 254D horizontally neighboring the second array region 254B in the X-direction may include additional odd SA devices coupled to additional odd digit lines within the memory array structure 300 (FIG. 2D) by way of the digit line routing and contact structures 266 associated with the SA sections 260; or vice versa.

As shown in FIG. 2C, the SA devices (e.g., odd SA devices or even SA devices) within an individual SA section 260 of an individual array region 254 may be coupled to digit lines (e.g., odd digit lines or even digit lines) horizontally extending through the array region 254, and may also be coupled to additional digit lines (e.g., additional odd digit lines or additional even digit lines) horizontally extending through another array region 254 horizontally neighboring the array region 254 in the Y-direction. For example, some odd SA devices within the first SA section 260A of the second array region 254B may be coupled to odd digit lines horizontally extending through the second array region 254B by way of some digit line routing and contact structures 266 extending to and through the first digit line exit sub-region 256A horizontally neighboring the second array region 254B in the Y-direction; and some additional odd SA devices within the first SA section 260A of the second array region 254B may be coupled to additional odd digit lines horizontally extending through the first array region 254A by way of some additional digit line routing and contact structures 266 extending to and through the first digit line exit sub-region 256A. As another example, some even SA devices within the second SA section 260B of the first array region 254A may be coupled to even digit lines horizontally extending through the first array region 254A by way of some digit line routing and contact structures 266 extending to and through the second digit line exit sub-region 256B horizontally neighboring the first array region 254A in the Y-direction; and some additional even SA devices within the second SA section 260B of the first array region 254A may be coupled to additional even digit lines horizontally extending through the second array region 254B by way of some additional digit line routing and contact structures 266 extending to and through the second digit line exit sub-region 256B.

With maintained reference to FIG. 2C, the SWD sections 262 within a horizontal area an individual array region 254 (e.g., the first array region 254A, the second array region 254B, the third array region 254C, or the fourth array region 254D) of the microelectronic device 100 may include a first SWD section 262A and a second SWD section 262B. An individual first SWD section 262A and an individual second SWD section 262B of the control circuitry structure 200 within a horizontal area an individual array region 254 of the microelectronic device 100 may be positioned at or proximate different corners of the array region 254 than the first SA section 260A and a second SA section 260B. In addition, the corner of the array region 254 associated with first SWD section 262A may oppose (e.g., diagonally oppose) the corner of the array region 254 associated with second SWD section 262B. For example, as shown in FIG. 2C, for an individual array region 254, the first SWD section 262A may be positioned at or proximate a third corner 264C of the array region 254, and the second SWD section 262B may be positioned at or proximate a fourth corner 264D of the array region 254 located diagonally opposite (e.g., kitty-corner) the third corner 264C.

For each SWD section 262 (e.g., the first SWD section 262A, the second SWD section 262B) of the control circuitry structure 200 within a horizontal area of an individual array region 254 of the microelectronic device 100, the SWD devices of the SWD section 262 may be coupled to a group of word lines horizontally extending (e.g., in the X-direction) through the array region 254 by way of word line routing and contact structures 268.

For an individual patch sub-section 252 of the microelectronic device 100, the SWD devices of the SWD sections 262 of the control circuitry structure 200 within array regions 254 horizontally neighboring one another in the X-direction (e.g., the first array region 254A and the third array region 254C; the second array region 254B and the fourth array region 254D) may be coupled to different groups of word lines than one another. For example, each of the SWD sections 262 (e.g., each of the first SWD section 262A and the second SWD section 262B) of the control circuitry structure 200 within the first array region 254A may include so-called "even" SWD devices coupled to even word lines within the memory array structure 300 (FIG. 2D) by way of the word line routing and contact structures 268 associated with the SWD sections 262; and each of the SWD sections 262 (e.g., each of the first SWD section 262A and the second SWD section 262B) of the control circuitry structure 200 within the third array region 254C may include so-called "odd" SWD devices coupled to odd word lines within the memory array structure 300 (FIG. 2D) by way of the word line routing and contact structures 268 associated with the SWD sections 262; or vice versa. The even word lines of the memory array structure 300 (FIG. 2D) may horizontally alternate with the odd word lines of the memory array structure 300 (FIG. 2D) in the Y-direction. The SWD devices of each of the SWD sections 262 of the control circuitry structure 200 within horizontal area of the first array region 254A may not be coupled to any odd word lines; and the SWD devices of each of the SWD sections 262 of the control circuitry structure 200 within horizontal area of the third array region 254C may not be coupled to any even word lines; or vice versa. Similarly, each of the SWD sections 262 (e.g., each of the first SWD section 262A and the second SWD section 262B) of the control circuitry structure 200 within the second array region 254B horizontally neighboring the first array region 254A in the Y-direction may include additional even SWD devices coupled to additional even word lines within the memory array structure 300 (FIG. 2D) by way of the word line routing and contact structures 268 associated with the SWD sections 262; and each of the SWD sections 262 (e.g., each of the first SWD section 262A and the second SWD section 262B) of the control circuitry structure 200 within the fourth array region 254D horizontally neighboring the third array region 254C in the Y-direction may include additional odd SWD devices coupled to additional odd word lines within the memory array structure 300 (FIG. 2D) by way of the word line routing and contact structures 268 associated with the SWD sections 262; or vice versa.

As shown in FIG. 2C, the SWD devices (e.g., odd SWD devices or even SWD devices) within an individual SWD section 262 of an individual array region 254 may be coupled to word lines (e.g., odd word lines or even word lines) horizontally extending through the array region 254, and may also be coupled to additional word lines (e.g., additional odd word lines or additional even word lines) horizontally extending through another array region 254 horizontally neighboring the array region 254 in the X-direction. For example, some odd SWD devices within the first SWD section 262A of the third array region 254C may be coupled to odd word lines horizontally extending through the third array region 254C by way of some word line routing and contact structures 268 extending to and through the second word line exit sub-region 258B horizontally neighboring the third array region 254C in the X-direction; and some additional odd SWD devices within the first SWD section 262A of the third array region 254C may be coupled to additional odd word lines 120A horizontally extending through the first array region 254A by way of some additional word line routing and contact structures 268 extending to and through the second word line exit sub-region 258B. As another example, some even SWD devices within the second SWD section 262B of the first array region 254A may be coupled to even word lines horizontally extending through the first array region 254A by way of some word line routing and contact structures 268 extending to and through the first word line exit sub-region 258A horizontally neighboring the first array region 254A in the X-direction; and some additional even SWD devices within the second SWD section 262B of the first array region 254A may be coupled to additional even word lines 120B horizontally extending through the third array region 254C by way of some additional word line routing and contact structures 268 extending to and through the first word line exit sub-region 258A.

With maintained reference to FIG. 2C, within the horizontal area of an individual patch sub-section 252 of the microelectronic device 100, the control circuitry structure 200 may include additional control logic sections individually including additional control logic devices (e.g., control logic devices other than SA devices and SWD devices). For example, for each array region 254 within the horizontal area of an individual patch sub-section 252 of the microelectronic device 100, the control circuitry structure 200 may include additional control logic sections positioned horizontally between (e.g., at relatively more horizontally central positions within the array region 254) the SA sections 260 and the SWD sections 262. The additional control logic sections may include, but are not limited to, column decoder device sections including column decoder devices, and MWD sections including MWD devices. In some embodiments, the additional control logic sections of the control circuitry structure 200 within the horizontal area of an individual patch sub-section 252 of the microelectronic device 100 include column decoder device sections inwardly horizontally neighboring (e.g., directly horizontally adjacent) the SA sections 260 in the Y-direction, and MWD sections inwardly horizontally neighboring (e.g., directly horizontally adjacent) the SWD sections 262 in the X-direction.

Referring next to FIG. 2D, an example arrangement of various circuitry of the memory array structure 300 within horizontal areas of the periphery circuitry region 202 and the bank regions 204 of the microelectronic device 100 is depicted. For case and understanding of the drawings and related description not all features of the microelectronic device 100 previously described with reference to FIG. 2A are depicted in FIG. 2D. However, as previously mentioned herein, it will be understood that any features of the microelectronic device 100 described with reference to one or more of FIGS. 2A through 2E are applicable to one or more (e.g., all) others of FIGS. 2A through 2E.

Within a horizontal area of the periphery circuitry region 202 of the microelectronic device 100, the memory array structure 300 may include at least one additional capacitor section 302 including circuitry (e.g., capacitors) configured and positioned to assist with powering various devices (e.g., control logic devices, access devices) of the microelectronic device 100. For example, the additional capacitor section 302 may include capacitors for charge pumps, RC filters, peaking amplifiers, capacitors for AC coupling (e.g., RF amplifier capacitors), capacitors for DC blocking (e.g., DC blocking capacitors), and decoupling capacitors, and capacitors for powering one or more control logic devices, such as one or more of DSA devices, one or more ECC devices, one or more voltage generators (e.g., one or more low voltage generators, one or more high voltage generators), one or more command address devices, one or more capacitor structures (e.g., one or more decoupling capacitors), one or more data outputs (e.g., DQU, DQL), one or more command address devices, one or more antifuse devices, one or more DLL systems, one or more delay enable devices (e.g., one or more dQ enable delays devices), one or more temperature sensors, one or more data junctions for channeling data into and out of memory banks, and one or more additional control logic devices. Capacitors within the additional capacitor section 302 of the memory array structure 300 may be coupled to BEOL structures of the microelectronic device 100.

The additional capacitor section 302 of the memory array structure 300 may horizontally extend across one or more (e.g., each) of the central sub-region 202A, the first arm sub-region 202B, and the second arm sub-region 202C of the periphery circuitry region 202 of the microelectronic device 100. In some embodiments, portions of the additional capacitor section 302 of the memory array structure 300 are positioned within horizontal areas of each of the central sub-region 202A, the first arm sub-region 202B, and the second arm sub-region 202C of the periphery circuitry region 202 of the microelectronic device 100.

Within the horizontal areas of the first bank sub-regions 206 of the microelectronic device 100, the memory array structure 300 may include memory array banks 304. Each first bank sub-region 206 of the microelectronic device 100 may include an individual memory array bank 304 of the memory array structure 300 within the horizontal area thereof. As described in greater detail below, each of the memory array banks 304 may include one or more memory array regions individually including an array of memory cells (e.g., an array of DRAM cells).

Within the horizontal areas of the second bank sub-regions 208 of the microelectronic device 100, the memory array structure 300 may include additional memory array banks 306. Each second bank sub-region 208 of the microelectronic device 100 may include an individual additional memory array bank 306 of the memory array structure 300 within the horizontal area thereof. As described in greater detail below, each of the additional memory array banks 306 may include one or more memory array regions individually including an array of memory cells (e.g., an array of DRAM cells). The additional memory array bank 306 within an individual second bank sub-region 208 may be relatively smaller (e.g., shorter) than the memory array bank 304 within the horizontal area of an individual first bank sub-region 206 in the Y-direction, and may be relatively bigger (e.g., wider) than the memory array bank 304 within the horizontal area of the first bank sub-region 206 in the X-direction. In some embodiments, the additional memory array bank 306 within an individual second bank sub-region 208 has a length (e.g., first horizontal dimension) in the Y-direction that is less than or equal to about one-half (½) of a length (e.g., first horizontal dimension) in the Y-direction of the memory array bank 304 within the horizontal area an individual first bank sub-region 206. In addition, in some embodiments, the additional memory array bank 306 within an individual second bank sub-region 208 has a width (e.g., second horizontal dimension) in the X-direction that is greater than or equal to about two-times (2×) of a width (e.g., second horizontal dimension) in the X-direction of the memory array bank 304 within the horizontal area an individual first bank sub-region 206.

As previously mentioned, FIG. 2E is a simplified, schematic view of a portion B (illustrated with a dashed box in FIG. 2D) of the memory array structure 300 of the microelectronic device 100, in accordance with embodiments of the disclosure. The portion B illustrates a configuration of the memory array structure 300 within a horizontal area of a patch sub-section 252 of the microelectronic device 100. The patch sub-section 252 may be positioned within a horizontal area of one (1) of the second bank sub-regions 208 of one of the bank regions 204 (e.g., the first bank region 204A) of the control circuitry structure 200. Each of the second bank sub-regions 208 (FIG. 2D) of the memory array structure 300 may include multiple (e.g., a group, a plurality) of patch sub-sections 252 within a horizontal area thereof, and the memory array structure 300 may exhibit a similar configuration as that shown in FIG. 2E within a horizontal area of each patch sub-section 252. In addition, within a horizontal area of an individual first bank sub-region 206 (FIG. 2B) of the microelectronic device 100, the memory array structure 300 may include multiple (e.g., a group, a plurality) of the patch sub-sections 252, and the memory array structure 300 may exhibit a similar configuration as that shown in FIG. 2E within the horizontal area of each patch sub-section 252.

As shown in FIG. 2E, the memory array structure 300 of the microelectronic device 100 may include an array of memory cells 308, digit lines 310, and word lines 312 within a horizontal area of each array region 254 of an individual patch sub-section 252 of the microelectronic device 100. The array of memory cells 308 may be coupled to the digit lines 310 and the word lines 312. The digit lines 310 may extend in the Y-direction, and may be coupled to SA devices of the SA sections 260 (FIG. 2C) of the control circuitry structure 200 (FIG. 2C). The word lines 312 may extend in the X-direction, and may be coupled to SWD devices of the SWD sections 262 (FIG. 2C) of the control circuitry structure 200 (FIG. 2C).

For an individual patch sub-section 252 of the microelectronic device 100, the digit lines 310 within the memory array structure 300 may include odd digit lines 310A and even digit lines 310B. As previously discussed herein with reference to FIG. 2C, the odd digit lines 310A may be coupled to odd SA devices of the SA sections 260 of the control circuitry structure 200, and the even digit lines 310B may be coupled to even SA devices of the SA sections 260 of the control circuitry structure 200.

For an individual patch sub-section 252 of the microelectronic device 100, the word lines 312 within the memory array structure 300 may include odd word lines 312A and even word lines 312B. As previously discussed herein with reference to FIG. 2C, the odd word lines 312A may be coupled to odd SWD devices of the SWD sections 262 (FIG. 2C) of the control circuitry structure 200 (FIG. 2C), and the even word lines 312B may be coupled to even SWD devices of the SWD sections 262 (FIG. 2C) of the control circuitry structure 200 (FIG. 2C).

Thus, in accordance with embodiments of the disclosure, a microelectronic device comprises a periphery circuitry region, bank regions, a control circuitry structure, and a memory array structure. The periphery circuitry region comprises a central sub-region, and two arm sub-regions extending from the central sub-region from the central sub-region in a first horizontal direction. Each of the two arm sub-regions has a different length than the central sub-region in a second horizontal direction orthogonal to the first horizontal direction. The bank regions are horizontally outward of the periphery circuitry region. The control circuitry structure comprises relatively more speed-critical circuitry within a horizontal area of the periphery circuitry region, and relatively less speed-critical circuitry within horizontal areas of the bank regions. The memory array structure vertically underlies the control circuitry structure and comprises arrays of memory cells within the horizontal areas of the bank regions.

Figure 3A:
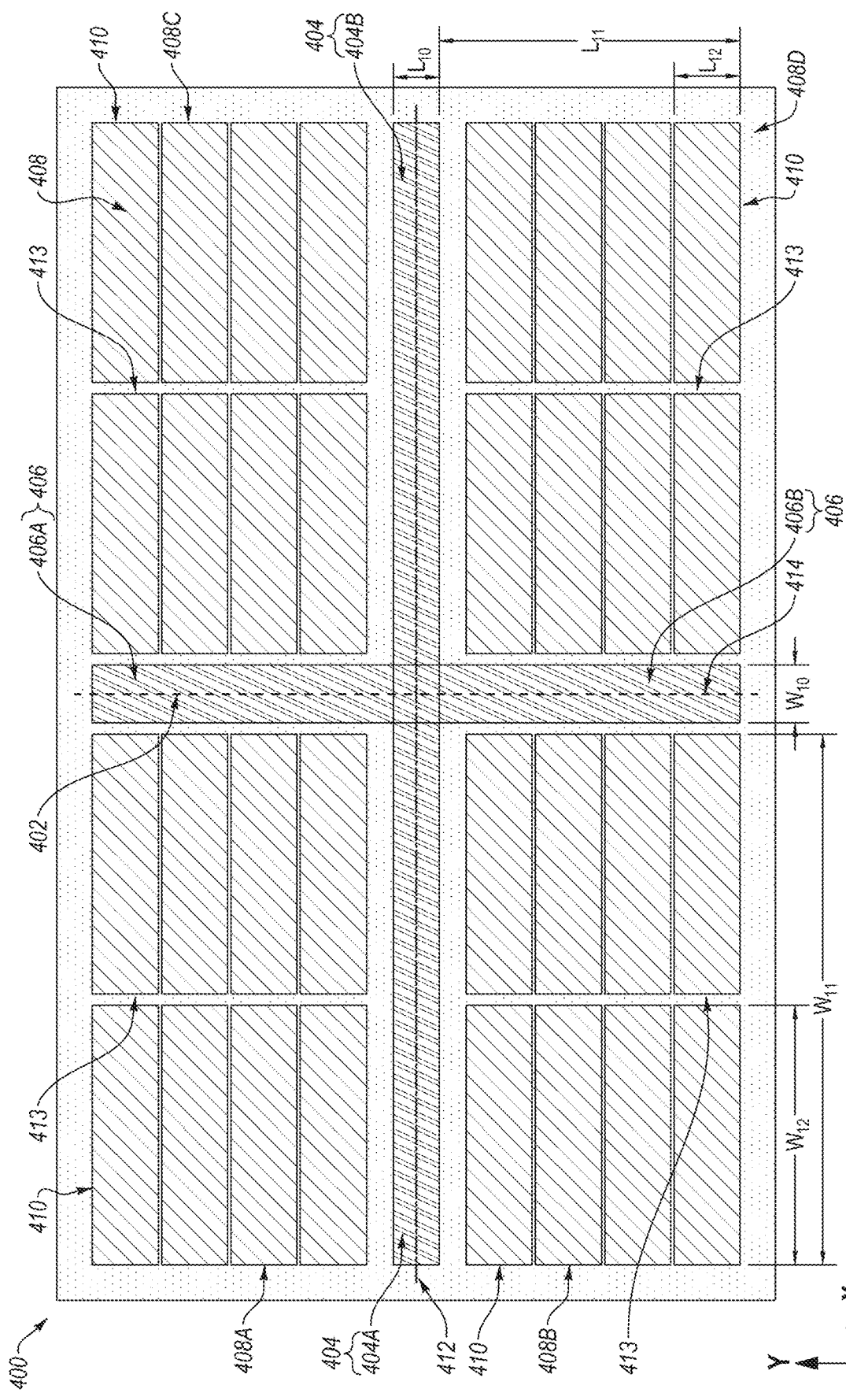
FIG. 3A is a simplified, schematic view of a microelectronic device, illustrating a general layout of different regions of the microelectronic device, in accordance with some embodiments of the disclosure.
Figure 3B:
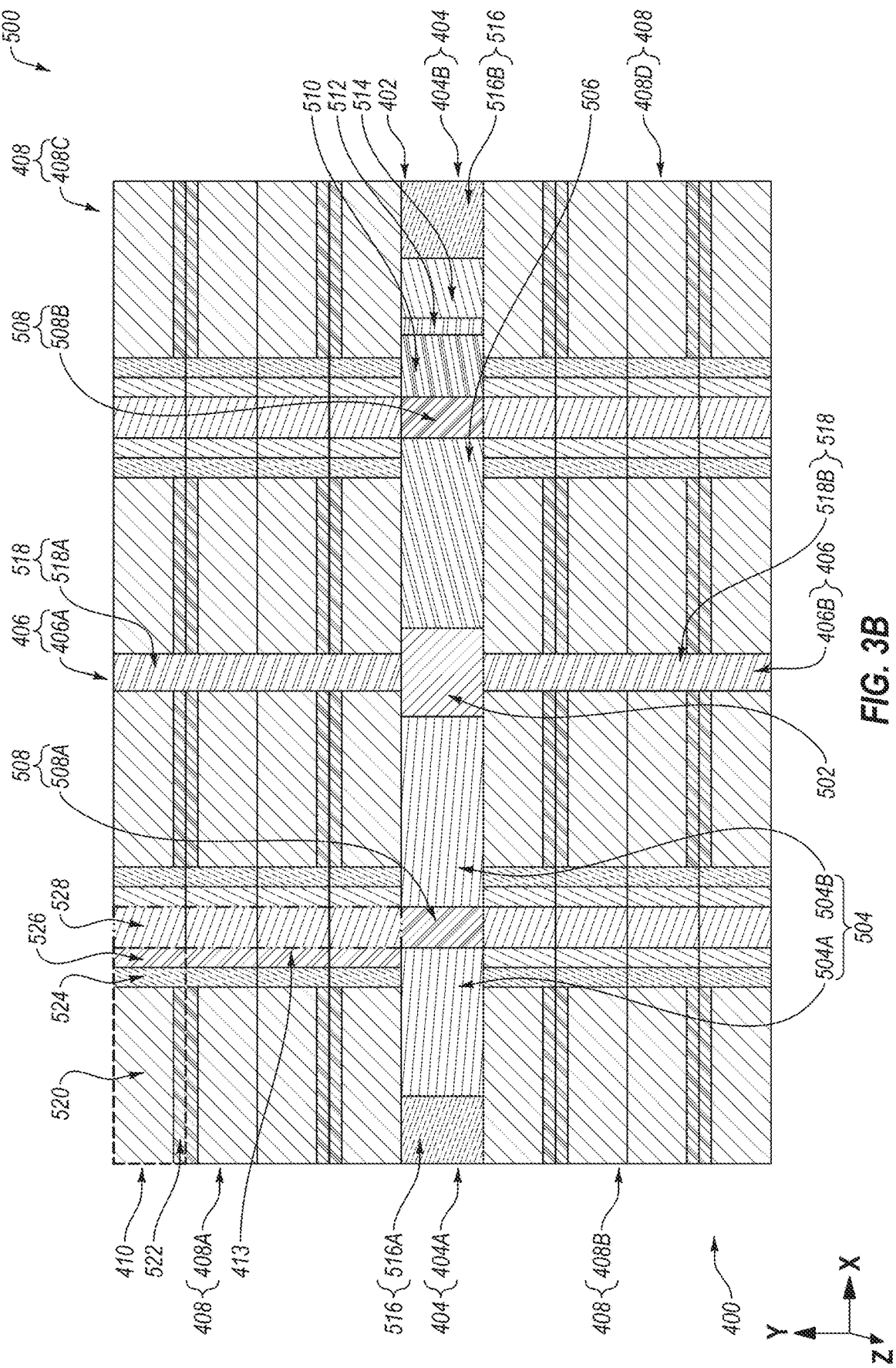
FIG. 3B is a simplified, schematic view of a control circuitry structure of the microelectronic device depicted in FIG. 3A, showing arrangements of various circuitry of the control circuitry structure within the different regions of the microelectronic device, in accordance with some embodiments of the disclosure.
Figure 3C:
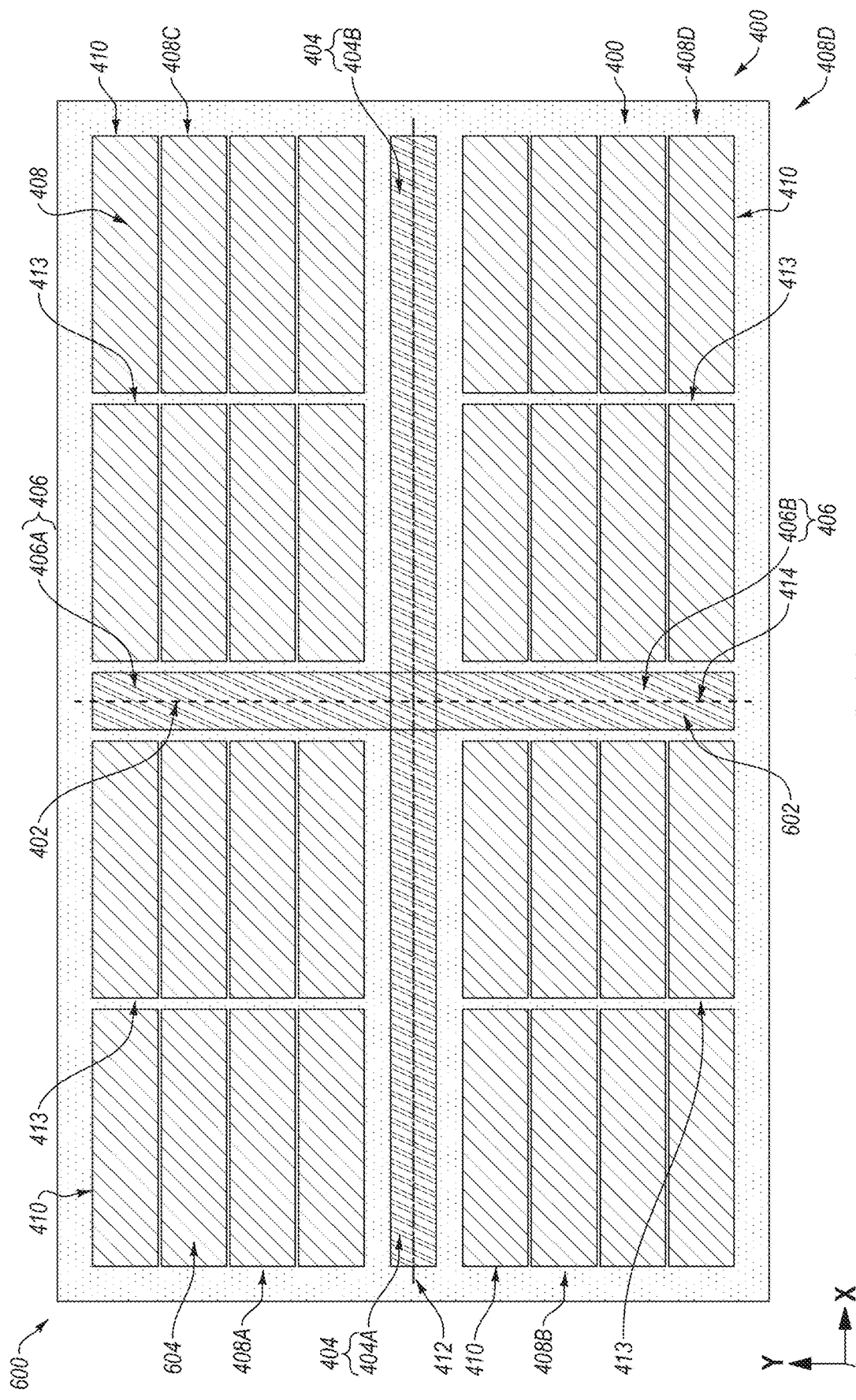
FIG. 3C is a simplified, schematic view of a memory array structure of the microelectronic device depicted in FIG. 3A, showing arrangements of various circuitry of the memory array structure within the different regions of the microelectronic device, in accordance with some embodiments of the disclosure.

In additional embodiments, the microelectronic device 100 is configured to have a different configuration than that previously described herein with reference to FIGS. 2A through 2E. The microelectronic device 100 may, for example, have a different general layout of different regions thereof than that previously described herein with reference to FIG. 2A, and may also have different arrangements of various circuitry within the control circuitry structure 200 (FIG. 2B) and the memory array structure 300 (FIG. 2D) thereof. As a non-limiting example, FIGS. 3A through 3C are simplified, schematic views of different portions of a microelectronic device 400 (e.g., a memory device, such as a DRAM device), in accordance with additional embodiments of the disclosure. The microelectronic device 400 may have a general configuration substantially similar to the general configuration of microelectronic device 100 previously described with reference to FIG. 1, but may have different arrangements of various features (e.g., regions, circuitry, devices, structures) thereof than those of the microelectronic device 100 previously described with reference to FIGS. 2A through 2E. FIG. 3A is a simplified, schematic view of the microelectronic device 400, illustrating a general layout (e.g., floor plan) of different regions of the microelectronic device 400, in accordance with some embodiments of the disclosure. FIG. 3B is a simplified, schematic view of a control circuitry structure 500 of the microelectronic device 400, showing arrangements of various circuitry of the control circuitry structure 500 within the different regions of the microelectronic device 400, in accordance with some embodiments of the disclosure. FIG. 3C is a simplified, schematic view of a memory array structure 600 of the microelectronic device 400, showing arrangements of various circuitry of the memory array structure 600 within the different regions of the microelectronic device 400, in accordance with some embodiments of the disclosure.

Referring to FIG. 3A, the microelectronic device 400 may include a periphery circuitry region 402 and bank regions 408. As described in further detail below, within the control circuitry structure 500 (FIG. 3B), relatively more speed-critical circuitry and devices may be positioned within the horizontal area of the periphery circuitry region 402, and relatively less speed-critical circuitry and devices may be positioned within the horizontal areas of the bank regions 408.

The periphery circuitry region 402 of the microelectronic device 400 may include a street sub-region 404, and an additional street sub-region 406 integral and continuous with the street sub-region 404. The additional street sub-region 406 may horizontally intersect the street sub-region 404. A location where the street sub-region 404 intersects with and horizontally overlaps the additional street sub-region 406 may be considered a central sub-region of the periphery circuitry region 402. The street sub-region 404 may extend in a substantially linear path in the X-direction, and may be further divided in the X-direction into a first street sub-region portion 404A and a second street sub-region portion 404B. The additional street sub-region 406 may extend in a substantially linear path in the Y-direction, and may be further divided in the Y-direction into a first additional street sub-region portion 406A and a second additional street sub-region portion 406B.

As shown in FIG. 3A, the street sub-region 404 and the additional street sub-region 406 of the periphery circuitry region 402 may exhibit rectangular horizontal cross-sectional shapes. The combination of the street sub-region 404 and the additional street sub-region 406 may provide the periphery circuitry region 402 with an irregular horizontal cross-sectional shape, such as shape similar to that of a plus sign (+).

In some embodiments, a horizontal centerline, in the Y-direction, of the street sub-region 404 is substantially aligned with a horizontal centerline 412, in the Y-direction, of the microelectronic device 400; and an additional horizontal centerline, in the X-direction, of the additional street sub-region 406 is substantially aligned with an additional horizontal centerline 414, in the X-direction, of the microelectronic device 400. The horizontal centerline 412, in the Y-direction, of the microelectronic device 400 may substantially linearly extend in the X-direction; and the additional horizontal centerline 414, in the X-direction, of the microelectronic device 400 may substantially linearly extend in the Y-direction. The additional horizontal centerline 414, in the X-direction, of the microelectronic device 400 may divide the street sub-region 404 into the first street sub-region portion 404A and the second street sub-region portion 404B. The horizontal centerline 412, in the Y-direction, of the microelectronic device 400 may divide the additional street sub-region 406 into the first additional street sub-region portion 406A and the second additional street sub-region portion 406B. In additional embodiments, the horizontal centerline, in the Y-direction, of the street sub-region 404 is offset from the horizontal centerline 412, in the Y-direction, of the microelectronic device 400; and/or the additional horizontal centerline, in the X-direction, of the additional street sub-region 406 is offset from the additional horizontal centerline 414, in the X-direction, of the microelectronic device 400.

As shown in FIG. 3A, the street sub-region 404 of the periphery circuitry region 402 may continuously extend in X-direction across at least a majority (e.g., greater than 50 percent, greater than or equal to 75 percent, greater than or equal to 90 percent, greater than or equal to 95 percent) of the microelectronic device 400, and may have a first length $L_{10}$ in the Y-direction. In addition, the additional street sub-region 406 of the periphery circuitry region 402 may continuously extend in Y-direction across at least a majority (e.g., greater than 50 percent, greater than or equal to 75 percent, greater than or equal to 90 percent, greater than or equal to 95 percent) of the microelectronic device 400 and may have a first width $W_{10}$ in the X-direction. In some embodiments, the first width $W_{10}$, in the X-direction, of the additional street sub-region 406 is substantially equal to the first length $L_{10}$, in the Y-direction, of the street sub-region 404. In additional embodiments, the first width $W_{10}$, in the X-direction, of the additional street sub-region 406 is different than (e.g., less than, greater than) the first length $L_{10}$, in the Y-direction, of the street sub-region 404.

Still referring to FIG. 2A, the bank regions 408 of the microelectronic device 400 may be horizontally separated from one another by the periphery circuitry region 402 of the microelectronic device 400. The microelectronic device 400 may, for example, including four (4) bank regions 408: a first bank region 408A, a second bank region 408B, a third bank region 408C, and a fourth bank region 408D. The second bank region 408B may horizontally neighbor the first bank region 408A in the Y-direction, and may horizontally neighbor the fourth bank region 408D in the X-direction. The third bank region 408C may horizontally neighbor the first bank region 408A in the X-direction, and may horizontally neighbor the fourth bank region 408D in the Y-direction. The fourth bank region 408D may horizontally neighbor the third bank region 408C in the Y-direction, and may horizontally neighboring the second bank region 408B in the Y-direction. In additional embodiments, microelectronic device 400 includes a different number of bank regions 408. For example, the microelectronic device 400 may include greater than four (4) bank regions 408, or less than four (4) bank regions 408.

Each of the bank regions 408 (e.g., the first bank region 408A, the second bank region 408B, the third bank region 408C, the fourth bank region 408D) of the microelectronic device 400 may exhibit a rectangular horizontal cross-sectional shape. As shown in FIG. 3A, each of the bank regions 408 may have a second length $L_{11}$ in the Y-direction and a second width $W_{11}$ in the X-direction.

An individual bank region 408 of the microelectronic device 400 may include bank sub-regions 410 and at least one throat sub-region 413. The throat sub-region 413 of the bank region 408 may extend in a substantially linear path in the Y-direction; and may be interposed, in the X-direction, between some (e.g., a group) of the multiple bank sub-regions 410 of the bank region 408 from some others (e.g., an additional group) of the multiple bank sub-regions 410 of the bank region 408. As described in further detail below, within the memory array structure 600 (FIG. 3C) of the microelectronic device 400, banks of memory cells may be positioned within the horizontal areas of the bank sub-regions 410 of the bank regions 408.

The bank sub-regions 410 of the bank regions 408 (e.g., the first bank region 408A, the second bank region 408B, the third bank region 408C, the fourth bank region 408D) of the microelectronic device 400 may exhibit rectangular horizontal cross-sectional shapes. In some embodiments, the bank sub-regions 410 exhibit substantially the same rectangular horizontal cross-sectional shape as one another. As shown in FIG. 3A, each of the bank sub-regions 410 may have a third length $L_{12}$ in the Y-direction and a third width $W_{12}$ in the X-direction.

The bank regions 408 (e.g., the first bank region 408A, the second bank region 408B, the third bank region 408C, the fourth bank region 408D) of the microelectronic device 400 may individually include a desired quantity of the bank sub-regions 410. As shown in FIG. 3A, in some embodiments, an individual bank region 408 includes eight (8) of the bank sub-regions 410 within a horizontal area thereof. The eight (8) of the bank sub-regions 410 may include a first group of four (4) bank sub-regions 410 positioned at one side of the throat sub-region 413 of the bank region 408, and a second group of four (4) bank sub-regions 410 positioned to at another, opposing side of the throat sub-region 413 of the bank region 408. The four (4) bank sub-regions 410 of the first group may be substantially aligned with one another in the X-direction. The four (4) bank sub-regions 410 of the second group may also be substantially aligned with one another in the X-direction. The throat sub-region 413 of the bank region 408 horizontally separate, in the X-direction, the first group of four (4) bank sub-regions 410 from the second group of four (4) bank sub-regions 410. In additional embodiments, one or more (e.g., each) of the bank regions 408 individually includes a different quantity of bank sub-regions 410 (e.g., greater than eight (8) bank sub-regions 410, less than eight (8) bank sub-regions 410) within the horizontal area thereof.

Referring next to FIG. 3B, an example arrangement of various circuitry of the control circuitry structure 500 within horizontal areas of the periphery circuitry region 402 and the bank regions 408 of the microelectronic device 400 is depicted. For case and understanding of the drawings and related description not all features of the microelectronic device 400 previously described with reference to FIG. 3A are depicted in FIG. 3B. However, it will be understood that any features of the microelectronic device 400 described with reference to one or more of FIGS. 3A through 3C are applicable to one or more (e.g., all) others of FIGS. 3A through 3C.

As previously described herein, within a horizontal area of the periphery circuitry region 402 of the microelectronic device 400, the control circuitry structure 500 may contain relatively more speed-critical circuitry and devices. For example, within the horizontal area of the periphery circuitry region 402 of the microelectronic device 400, the control circuitry structure 500 may include, without limitation, an internal clock and timing generator section 502, data I/O and control sections 504, a command and address (CA) section 506, data junction sections 508, an analog section 510, a capacitor section 512, a fuse section 514, voltage generator sections 516, and package interface sections 518. The foregoing sections and an arrangement thereof within the horizontal area of the periphery circuitry region 402 of the microelectronic device 400 is described in further detail below.

The internal clock and timing generator section 502 of the control circuitry structure 500 may include devices and circuitry substantially similar to those of the internal clock and timing generator section 216 (FIG. 2B) of the control circuitry structure 200 (FIG. 2B) previously described herein with reference to FIG. 2B. As shown in FIG. 3B, the internal clock and timing generator section 216 may be positioned at or proximate a horizontal center of the horizontal area of the periphery circuitry region 402, such as at or proximate the intersection of the street sub-region 404 and the additional street sub-region 406 of the periphery circuitry region 402. In some embodiments, the internal clock and timing generator section 502 is positioned at or proximate the horizontal center of the microelectronic device 400 defined by the intersection of the horizontal centerline 412 (FIG. 3A), in the Y-direction, of the microelectronic device 400 and the additional horizontal centerline 414 (FIG. 3A), in the X-direction, of the microelectronic device 400.

The data I/O and control sections 504 of the control circuitry structure 500 may include devices and circuitry substantially similar to those of the data I/O and control section 214 (FIG. 2B) of the control circuitry structure 200 (FIG. 2B) previously described herein with reference to FIG. 2B. As shown in FIG. 3B, the data I/O and control sections 504 may be positioned within a horizontal area of the street sub-region 404 of the periphery circuitry region 402 of the microelectronic device 400. The data I/O and control sections 504 may, for example, include a first data I/O and control section 504A and a second data I/O and control section 504B. In some embodiments, the first data I/O and control section 504A and a second data I/O and control section 504B each positioned within the horizontal area of the first street sub-region portion 404A of the periphery circuitry region 402 of the microelectronic device 400. The first data I/O and control section 504A may be positioned relatively more proximate to the internal clock and timing generator section 502 in the X-direction; and the second data I/O and control section 504B may be positioned relatively more distal from the internal clock and timing generator section 502 in the X-direction. The first data I/O and control section 504A and the second data I/O and control section 504B may be horizontally offset from one another in the X-direction by one or more other of the sections (e.g., one of the data junction sections 508) of the control circuitry structure 500, as described in further detail below. Data I/O and control circuitry 138 (FIG. 1) within the first data I/O and control section 504A of the control circuitry structure 500 may be utilized for banks of memory cells of the memory array structure 600 (FIG. 3C) positioned within a horizontal area of a first half (e.g., a half above the horizontal centerline 412 (FIG. 3A)) of the microelectronic device 400. Data I/O and control circuitry 138 (FIG. 1) within the second data I/O and control section 504B of the control circuitry structure 500 may be utilized for banks of memory cells of the memory array structure 600 (FIG. 3C) positioned within a horizontal area of a second, different half (e.g., a half below the horizontal centerline 412 (FIG. 3A)) of the microelectronic device 400.

The CA section 506 of the control circuitry structure 500 may include the CA input circuitry 115 and the CA decoder circuitry 124 previously described with reference of the FIG. 1. By way of non-limiting example, the CA section 506 may include one or more (e.g., each) of column address buffer circuits, center drivers circuit, EpprMode register circuits, Pcc control Wck circuits, Ecs control circuits, QED shifter circuits, Clkgen refresh circuits, column controller circuits, command extender circuits, Act_pre_cntl circuits, and BARArray timer circuits. As shown in FIG. 3B, the CA section 506 may also be positioned within the horizontal area of the street sub-region 404 of the periphery circuitry region 402 of the microelectronic device 400. In some embodiments, the CA section 506 is positioned within the horizontal area of the second street sub-region portion 404B of the periphery circuitry region 402 of the microelectronic device 400. The CA section 506 may be positioned proximate to the internal clock and timing generator section 502 in the X-direction, such as directly horizontally adjacent to the internal clock and timing generator section 502 in the X-direction.

The data junction sections 508 of the control circuitry structure 500 may include devices and circuitry substantially similar to those of the data junction sections 228 (FIG. 2B) of the control circuitry structure 200 (FIG. 2B) previously described herein with reference to FIG. 2B. The data junction sections 508 may also be positioned within the horizontal area of the street sub-region 404 of the periphery circuitry region 402 of the microelectronic device 400. The data junction sections 508 may, for example, include a first data junction section 508A and a second data junction section 508B. In some embodiments, the first data junction section 508A is positioned within the horizontal area of the first street sub-region portion 404A of the periphery circuitry region 402; and the second data junction section 508B is positioned within the horizontal area of the second street sub-region portion 404B of the periphery circuitry region 402. The first data junction section 508A may be interposed, in the X-direction, between the first data I/O and control section 504A and the second data I/O and control section 504B. The second data junction section 508B may be interposed, in the X-direction, between the CA section 506 and the second data I/O and the analog section 510. As shown in FIG. 3B, the first data junction section 508A may horizontally overlap, in the X-direction, the throat sub-regions 413 of the first bank region 408A and the second bank region 408B of the microelectronic device 400; and the second data junction section 508B may horizontally overlap, in the X-direction, the throat sub-regions 413 of the third bank region 408C and the fourth bank region 408D of the microelectronic device 400.

The analog section 510 of the control circuitry structure 500 may include devices and circuitry substantially similar to those of the analog sections 226 (FIG. 2B) of the control circuitry structure 200 (FIG. 2B) previously described herein with reference to FIG. 2B. The analog section 510 may also be positioned within the horizontal area of the street sub-region 404 of the periphery circuitry region 402 of the microelectronic device 400. In some embodiments, the analog section 510 is positioned within the horizontal area of the second street sub-region portion 404B of the periphery circuitry region 402 of the microelectronic device 400. The analog section 510 may be positioned proximate to the second data junction section 508B in the X-direction, such as directly horizontally adjacent to the second data junction section 508B in the X-direction.

The capacitor section 512 of the control circuitry structure 500 may include devices and circuitry substantially similar to those of the capacitor sections 222 (FIG. 2B) of the control circuitry structure 200 (FIG. 2B) previously described herein with reference to FIG. 2B. The capacitor section 512 may also be positioned within the horizontal area of the street sub-region 404 of the periphery circuitry region 402 of the microelectronic device 400. In some embodiments, the capacitor section 512 is positioned within the horizontal area of the second street sub-region portion 404B of the periphery circuitry region 402 of the microelectronic device 400. The capacitor section 512 may be positioned proximate to the analog section 510 in the X-direction, such as directly horizontally adjacent to the analog section 510 in the X-direction.

The fuse section 514 of the control circuitry structure 500 may include devices and circuitry substantially similar to those of the fuse section(s) 220 (FIG. 2B) of the control circuitry structure 200 (FIG. 2B) previously described herein with reference to FIG. 2B. The fuse section 514 may also be positioned within the horizontal area of the street sub-region 404 of the periphery circuitry region 402 of the microelectronic device 400. In some embodiments, the fuse section 514 is positioned within the horizontal area of the second street sub-region portion 404B of the periphery circuitry region 402 of the microelectronic device 400. The fuse section 514 may be positioned proximate to the capacitor section 512 in the X-direction, such as directly horizontally adjacent to the capacitor section 512 in the X-direction.

The voltage generator sections 516 of the control circuitry structure 500 may include devices and circuitry substantially similar to those of the voltage generator sections 224 (FIG. 2B) of the control circuitry structure 200 (FIG. 2B) previously described herein with reference to FIG. 2B. The voltage generator sections 516 may also be positioned within the horizontal area of the street sub-region 404 of the periphery circuitry region 402 of the microelectronic device 400. The voltage generator sections 516 may, for example, include a first voltage generator section 516A and a second voltage generator section 516B. In some embodiments, the first voltage generator section 516A is positioned within the horizontal area of the first street sub-region portion 404A of the periphery circuitry region 402; and the second voltage generator section 516B is positioned within the horizontal area of the second street sub-region portion 404B of the periphery circuitry region 402. The first voltage generator section 516A may be positioned proximate to the first data I/O and control section 504A in the X-direction, such as directly horizontally adjacent to the first data I/O and control section 504A in the X-direction. The second voltage generator section 516B may be positioned proximate to the fuse section 514 in the X-direction, such as directly horizontally adjacent to the fuse section 514 in the X-direction.

The package interface sections 518 of the control circuitry structure 500 may include devices and circuitry substantially similar to those of the package interface sections 230 (FIG. 2B) of the control circuitry structure 200 (FIG. 2B) previously described herein with reference to FIG. 2B. The package interface sections 518 may be positioned within the horizontal area of the additional street sub-region 406 of the periphery circuitry region 402 of the microelectronic device 400. The package interface sections 518 may, for example, include a first package interface section 518A and a second package interface section 518B. In some embodiments, the first package interface section 518A is positioned within the horizontal area of the first additional street sub-region portion 406A of the periphery circuitry region 402; and the second package interface section 518B is positioned within the horizontal area of the second additional street sub-region portion 406B of the periphery circuitry region 402. The first package interface section 518A and the second package interface section 518B may individually be positioned proximate to the internal clock and timing generator section 502 in the Y-direction, such as directly horizontally adjacent to the internal clock and timing generator section 502 in the Y-direction. The internal clock and timing generator section 502 may be interposed between the first package interface section 518A and the second package interface section 518B in the Y-direction. The internal clock and timing generator section 502 may horizontally overlap, in the X-direction, the first package interface section 518A and the second package interface section 518B.

Within the horizontal area of an individual bank sub-region 410 of an individual bank region 408 of the microelectronic device 400, the control circuitry structure 500 may include a transistor array section 520, a row decoder section 522, a column decoder section 524, and a bank logic section 526. Within an individual bank sub-region 410, the row decoder section 522 may be positioned horizontally adjacent, in the Y-direction, the transistor array section 520; and the column decoder section 524 may be horizontally interposed, in the X-direction, between the bank logic section 240 and each of the transistor array section 520 and the row decoder section 522.

The transistor array section 520 of the control circuitry structure 500 within the horizontal area of an individual bank sub-region 410 of the microelectronic device 400 may include multiple patch sub-sections of the microelectronic device 400 within a horizontal area thereof. The patch sub-sections of the microelectronic device 400 may be substantially similar to the patch sub-sections 252 (FIG. 2C) of the microelectronic device 100 (FIG. 2C) previously described herein with reference to FIG. 2C. Within the horizontal area of an individual patch sub-section of the microelectronic device 400, the control circuitry structure 500 may include various control logic circuitry (e.g., SA circuitry; decoder circuitry, such as column decoder circuitry; word line driver circuitry, such as MWD circuitry and SWD circuitry). As a non-limiting example, within the horizontal area of an individual patch sub-section of the microelectronic device 400, the control circuitry structure 500 may exhibit the configuration previously described herein with reference to FIG. 2C.

The row decoder section 522 of the control circuitry structure 500 within the horizontal area of an individual bank sub-region 410 of the microelectronic device 400 may include row decoder circuitry configured for effectuating at least some row operations on a bank of memory cells within the memory array structure 600 (FIG. 3C) underlying the control circuitry structure 500. The bank of memory cells may be located within the horizontal area of the bank sub-region 410 of the microelectronic device 400, as described in further detail below with reference to FIG. 3C. As shown in FIG. 3C, the row decoder section 522 within the bank sub-region 410 may horizontally extend, in the X-direction, across at least a majority (e.g., greater than 50 percent, greater than or equal to 75 percent, greater than or equal to 90 percent, greater than or equal to 95 percent) of the transistor array section 520 within the bank sub-region 410. In addition, as shown in FIG. 3B, row decoder sections 522 of the control circuitry structure 500 within horizontal areas of some pairs of the bank sub-regions 410 neighboring one another in the Y-direction and aligned with one another in the X-direction may be positioned proximate (e.g., directly adjacent) one another in the Y-direction. The row decoder circuitry of the row decoder sections 522 positioned proximate one another in the Y-direction may be shared by other circuitry of the microelectronic device 400 within the horizontal areas of the some pairs of the bank sub-regions 410 of the microelectronic device 400.

The column decoder section 524 of the control circuitry structure 500 within the horizontal area of an individual bank sub-region 410 of the microelectronic device 400 may include column decoder circuitry configured for effectuating at least some column operations on a bank of memory cells within the memory array structure 600 (FIG. 3C) underlying the control circuitry structure 500. As shown in FIG. 3B, the column decoder section 524 within the bank sub-region 410 may be horizontally positioned, in the X-direction, at or proximate horizontal ends of the transistor array section 520 and the row decoder section 522. The column decoder section 524 may horizontally extend, in the Y-direction, across at least a majority (e.g., greater than 50 percent, greater than or equal to 75 percent, greater than or equal to 90 percent, greater than or equal to 95 percent) of an overall horizontal dimension (e.g., overall width in the Y-direction) of a combination of the transistor array section 520 and the row decoder section 522 within the bank sub-region 410.

The bank logic section 526 of the control circuitry structure 500 within the horizontal area an individual bank sub-region 410 of the microelectronic device 400 may include additional control logic circuitry for effectuating operation of the control logic circuitry of the transistor array section 520, the row decoder section 522, and the column decoder section 524 within the bank sub-region 410. As shown in FIG. 3B, the bank logic section 526 within the bank sub-region 410 may be horizontally positioned, in the X-direction, at or proximate a horizontal end of the column decoder section 524. The bank logic section 526 may horizontally extend, in the Y-direction, across at least a majority (e.g., greater than 50 percent, greater than or equal to 75 percent, greater than or equal to 90 percent, greater than or equal to 95 percent) of the column decoder section 524.

Still referring to FIG. 3B, within the horizontal area of an individual throat sub-region 413 of an individual bank region 408 of the microelectronic device 400, the control circuitry structure 500 may include control logic device sections 528. An individual control logic device section 528 may include various control logic circuitry for the microelectronic device 400 including, without limitation, DSA circuitry and ECC circuitry. In some embodiments, an individual control logic device section 528 both DSA circuitry and ECC circuitry within the horizontal area thereof. As shown in FIG. 3B, an individual throat sub-region 413 may include multiple control logic device sections 528 substantially aligned with one another in the X-direction. As a non-limiting example, within the horizontal area of an individual throat sub-region 413 of an individual bank region 408, the control circuitry structure 500 may include a column of four (4) control logic device sections 528. An individual control logic device section 528 may be overlap, in the Y-direction, two (2) bank sub-regions 410 of the bank region 408; and may be interposed, in the X-direction, between the two (2) bank sub-regions 410 of the bank region 408. The control logic circuitry (e.g., DSA circuitry, ECC circuitry) of an individual control logic device section 528 may be shared by other circuitry of the microelectronic device 400 within the horizontal areas of the two (2) bank sub-regions 410 horizontally neighboring the control logic device section 528. An individual control logic device section 528 may horizontally extend, in the Y-direction, across at least a majority (e.g., greater than 50 percent, greater than or equal to 75 percent, greater than or equal to 90 percent, greater than or equal to 95 percent) of each of the two (2) bank sub-regions 410 horizontally neighboring the control logic device section 528.

Referring next to FIG. 3C, an example arrangement of various circuitry of the memory array structure 600 within horizontal areas of the periphery circuitry region 402 and the bank regions 408 of the microelectronic device 400 is depicted. For case and understanding of the drawings and related description not all features of the microelectronic device 400 previously described with reference to FIG. 3A are depicted in FIG. 3C. However, as previously mentioned herein, it will be understood that any features of the microelectronic device 400 described with reference to one or more of FIGS. 3A through 3C are applicable to one or more (e.g., all) others of FIGS. 3A through 3C.

Within a horizontal area of the periphery circuitry region 402 of the microelectronic device 400, the memory array structure 600 may include at least one additional capacitor section 602 including circuitry (e.g., capacitors) configured and positioned to assist with powering various devices (e.g., control logic devices, access devices) of the microelectronic device 400. For example, the additional capacitor section 602 may include capacitors for charge pumps, RC filters, peaking amplifiers, capacitors for AC coupling (e.g., RF amplifier capacitors), capacitors for DC blocking (e.g., DC blocking capacitors), and decoupling capacitors, and capacitors for powering one or more control logic devices, such as one or more of DSA devices, one or more ECC devices, one or more voltage generators (e.g., one or more low voltage generators, one or more high voltage generators), one or more command address devices, one or more capacitor structures (e.g., one or more decoupling capacitors), one or more data outputs (e.g., DQU, DQL), one or more command address devices, one or more antifuse devices, one or more DLL systems, one or more delay enable devices (e.g., one or more dQ enable delays devices), one or more temperature sensors, one or more data junctions for channeling data into and out of memory banks, and one or more additional control logic devices. Capacitors within the additional capacitor section 602 of the memory array structure 600 may be coupled to BEOL structures of the microelectronic device 400.

The additional capacitor section 602 of the memory array structure 600 may horizontally extend across one or more (e.g., each) of the street sub-region 404 and the additional street sub-region 406 of the periphery circuitry region 402 of the microelectronic device 100. In some embodiments, portions of the additional capacitor section 602 of the memory array structure 600 are positioned within horizontal areas of each of the first street sub-region portion 404A, the second street sub-region portion 404B, the first additional street sub-region portion 406A, and the second additional street sub-region portion 406B of the periphery circuitry region 402 of the microelectronic device 400.

Within the horizontal areas of the bank sub-regions 410 of the microelectronic device 400, the memory array structure 600 may include memory array banks 604. Each bank sub-region 410 of the microelectronic device 400 may include an individual memory array bank 604 of the memory array structure 600 within the horizontal area thereof. The memory array bank 604 memory array bank 604 of the memory array structure 600 within the horizontal area of an individual bank sub-region 410 of the microelectronic device 400 may include multiple patch sub-sections of the microelectronic device 400 within a horizontal area thereof. The patch sub-sections of the microelectronic device 400 may be substantially similar to the patch sub-sections 252 (FIG. 2C) of the microelectronic device 100 (FIG. 2C) previously described herein with reference to FIG. 2C. Within the horizontal area of an individual patch sub-section of the microelectronic device 400, the memory array structure 600 may include various circuitry (e.g., memory cell arrays, digit lines, word lines). As a non-limiting example, within the horizontal area of an individual patch sub-section of the microelectronic device 400, the memory array structure 600 may exhibit the configuration previously described herein with reference to FIG. 2E.

Thus, in accordance with embodiments of the disclosure, a microelectronic device comprises a periphery circuitry region, bank regions, a control circuitry structure, and a memory array structure. The periphery circuitry region comprises a street sub-region substantially linearly extending in a first horizontal direction, and an additional street sub-region substantially linearly extending in a second horizontal direction orthogonal to the first horizontal direction. The additional street sub-region horizontally intersecting the street sub-region. The bank regions are horizontally separated from one another by the periphery circuitry region. The control circuitry structure comprises relatively more speed-critical circuitry within a horizontal area of the periphery circuitry region, and relatively less speed-critical circuitry within horizontal areas of the bank regions. The memory array structure is vertically below the control circuitry structure and comprises arrays of memory cells within the horizontal areas of the bank regions.

Furthermore, in accordance with embodiments of the disclosure, a memory device comprises a periphery circuitry region, bank regions, a control circuitry structure, and a memory array structure. The periphery circuitry region comprises a central sub-region, and at least two additional sub-regions horizontally extending from the central sub-region. The bank regions horizontally neighbor the periphery circuitry region. The control circuitry structure comprises relatively more speed-critical circuitry within a horizontal area of the periphery circuitry region, and relatively less speed-critical circuitry within horizontal areas of the bank regions. The memory array structure is attached to and vertically offset from the control circuitry structure. The memory array structure comprises arrays of memory cells within the horizontal areas of the bank regions.

Figure 4:
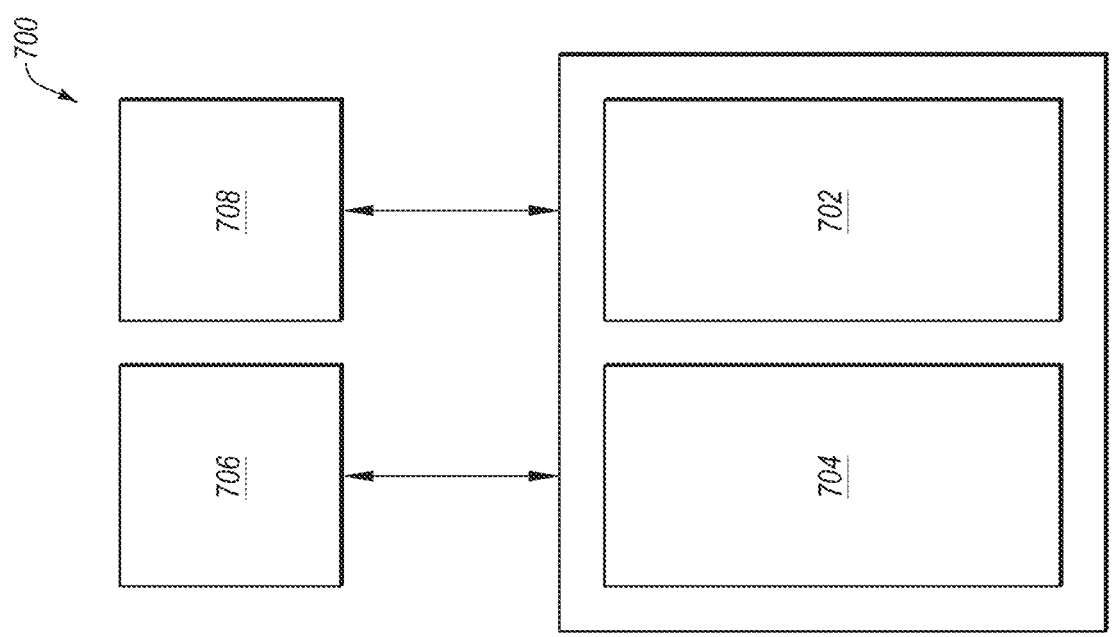
FIG. 4 is a simplified, schematic block diagram of an electronic system, in accordance with some embodiments of the disclosure.

Microelectronic devices (e.g., the microelectronic device 100, the microelectronic device 400) in accordance with embodiments of the disclosure may be used in embodiments of electronic systems of the disclosure. For example, FIG. 4 is a simplified, schematic block diagram illustrating an electronic system 700 according to embodiments of disclosure. The electronic system 700 may comprise, for example, a computer or computer hardware component, a server or other networking hardware component, a cellular telephone, a digital camera, a personal digital assistant (PDA), portable media (e.g., music) player, a Wi-Fi or cellular-enabled tablet such as, for example, an iPAD® or SURFACE® tablet, an electronic book, a navigation device, etc. The electronic system 700 includes at least one memory device 702. The memory device 702 may comprise, for example, a microelectronic device (e.g., the microelectronic device 100, the microelectronic device 400) previously described herein. The electronic system 700 may further include at least one electronic signal processor device 704 (often referred to as a "microprocessor"). The electronic signal processor device 704 may, optionally, comprise a microelectronic device (e.g., the microelectronic device 100, the microelectronic device 400) previously described herein. While the memory device 702 and the electronic signal processor device 704 are depicted as two (2) separate devices in FIG. 1, in additional embodiments, a single (e.g., only one) memory/processor device having the functionalities of the memory device 702 and the electronic signal processor device 704 is included in the electronic system 700. In such embodiments, the memory/processor device may include a microelectronic device (e.g., the microelectronic device 100, the microelectronic device 400) previously described herein. The electronic system 700 may further include one or more input devices 706 for inputting information into the electronic system 700 by a user, such as, for example, a mouse or other pointing device, a keyboard, a touchpad, a button, or a control panel. The electronic system 700 may further include one or more output devices 708 for outputting information (e.g., visual or audio output) to a user such as, for example, a monitor, a display, a printer, an audio output jack, a speaker, etc. In some embodiments, the input device 706 and the output device 708 comprise a single touchscreen device that can be used both to input information to the electronic system 700 and to output visual information to a user. The input device 706 and the output device 708 may communicate electrically with one or more of the memory device 702 and the electronic signal processor device 704.

The structures, devices, and methods of the disclosure advantageously facilitate one or more of improved microelectronic device performance, reduced costs (e.g., manufacturing costs, material costs), increased miniaturization of components, and greater packaging density as compared to conventional structures, conventional devices, and conventional methods. The structures, devices, and methods of the disclosure may also improve scalability, efficiency, and simplicity as compared to conventional structures, conventional devices, and conventional methods.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalent. For example, elements and features disclosed in relation to one embodiment may be combined with elements and features disclosed in relation to other embodiments of the disclosure.

What is claimed is:

1. A microelectronic device, comprising:
a periphery circuitry region comprising:
  central sub-region; and
  two arm sub-regions extending from the central sub-region from the central sub-region in a first horizontal direction, each of the two arm sub-regions having a different length than the central sub-region in a second horizontal direction orthogonal to the first horizontal direction;
bank regions horizontally outward of the periphery circuitry region;
a control circuitry structure comprising:
  relatively more speed-critical circuitry within a horizontal area of the periphery circuitry region; and
  relatively less speed-critical circuitry within horizontal areas of the bank regions; and
a memory array structure vertically underlying the control circuitry structure and comprising arrays of memory cells within the horizontal areas of the bank regions.

2. The microelectronic device of claim 1, wherein the two arm sub-regions of the periphery circuitry region comprise:
a first arm sub-region substantially linearly extending from a first side of the central sub-region in the first horizontal direction, a centerline of the first arm sub-region in the second horizontal direction offset from a centerline of the central sub-region in the second horizontal direction; and
a second arm sub-region substantially linearly extending from a second side of the central sub-region in the first horizontal direction, a centerline of the second arm sub-region in the second horizontal direction offset from each of the centerline of the first arm sub-region and the centerline of the central sub-region.

3. The microelectronic device of claim 2, wherein:
the central sub-region of the periphery circuitry region has a first length in the second horizontal direction; and
each of the first arm sub-region and the second arm sub-region of the periphery circuitry region has a second length in the second horizontal direction that is smaller than the first length.

4. The microelectronic device of claim 2, wherein, within a horizontal area of the central sub-region of the periphery circuitry region, the control circuitry structure comprises:
a data I/O and control section comprising data I/O and control circuitry;
an internal clock and timing generator section neighboring the data I/O and control section in the first horizontal direction and comprising internal clock and timing generator circuitry;
a command and address (CA) section neighboring the internal clock and timing generator section in the first horizontal direction and comprising CA circuitry; and
voltage generator sections neighboring each of the data I/O and control section, the internal clock and timing generator section, and the CA section in the second horizontal direction, the voltage generator sections each comprising voltage generator circuitry.

5. The microelectronic device of claim 4, wherein, within the central sub-region of the periphery circuitry region, the control circuitry structure further comprises:
a fuse section neighboring the CA section in the first horizontal direction and comprising antifuse circuitry; and
capacitor sections comprising multiple capacitors interposed, in the second horizontal direction, between the voltage generator sections and each of the data I/O and control section, the internal clock and timing generator section, the CA section, and the fuse section.

6. The microelectronic device of claim 4, wherein, within a horizontal area of each of the first arm sub-region and the second arm sub-region of the periphery circuitry region, the control circuitry structure comprises:
a data junction section comprising multiplexer (MUX) circuitry;
a package interface section comprising package interface circuitry; and
an analog section interposed between the data junction section and the package interface section in the second horizontal direction and comprising one of more of analog temperature dispense circuitry, analog-to-digital conversion (ADC) devices, and digital-to-analog conversion (DAC) devices.

7. The microelectronic device of claim 2, wherein each of the bank regions comprises:
first bank sub-regions each comprising:
  a first width in the first horizontal direction; and
  a first length in the second horizontal direction orthogonal to the first horizontal direction; and
second bank sub-regions each comprising:
  a second width, in the first horizontal direction, larger than the first width; and
  a second length, in the second horizontal direction, smaller than the first length.

8. The microelectronic device of claim 7, wherein, within a horizontal area of each of the first bank sub-regions, the control circuitry structure comprises:
a transistor array section;
a row decoder section comprising row decoder circuitry neighboring the transistor array section in the first horizontal direction; and
column decoder sections individually comprising column decoder circuitry neighboring opposing ends of the transistor array sections and the row decoder section in the second horizontal direction.

9. The microelectronic device of claim 8, wherein, within a horizontal area of each of the second bank sub-regions, the control circuitry structure comprises:
additional transistor array sections;
an additional row decoder section comprising additional row decoder circuitry interposed between the additional transistor array sections in the first horizontal direction; and
an additional column decoder section comprising additional column decoder circuitry neighboring the additional transistor array sections and the additional row decoder section in the second horizontal direction.

10. The microelectronic device of claim 1, wherein, within a horizontal area of the periphery circuitry region, the memory array structure comprises capacitors configured and positioned to assist with powering some devices within the control circuitry structure.

11. A microelectronic device, comprising:
a periphery circuitry region comprising:
a street sub-region substantially linearly extending in a first horizontal direction; and
an additional street sub-region substantially linearly extending in a second horizontal direction orthogonal to the first horizontal direction, the additional street sub-region horizontally intersecting the street sub-region;
bank regions horizontally separated from one another by the periphery circuitry region;
a control circuitry structure comprising:
relatively more speed-critical circuitry within a horizontal area of the periphery circuitry region; and
relatively less speed-critical circuitry within horizontal areas of the bank regions; and
a memory array structure vertically below the control circuitry structure and comprising arrays of memory cells within the horizontal areas of the bank regions.

12. The microelectronic device of claim 11, wherein:
a centerline of the street sub-region in the first horizontal direction is substantially aligned within a centerline of the additional street sub-region in the first horizontal direction; and
an additional centerline of the street sub-region in the second horizontal direction is substantially aligned within an additional centerline of the additional street sub-region in the second horizontal direction.

13. The microelectronic device of claim 11, wherein, within a horizontal area of street sub-region of the periphery circuitry region, the control circuitry structure comprises:
an internal clock and timing generator section comprising internal clock and timing generator circuitry, the internal clock and timing generator section at least partially horizontally overlapping an additional street sub-region of the periphery circuitry region in the first horizontal direction;
data I/O and control sections comprising data I/O and control circuitry neighboring a first side of the internal clock and timing generator section in the first horizontal direction; and
a command and address (CA) section neighboring comprising CA circuitry neighboring a second side of the internal clock and timing generator section in the first horizontal direction.

14. The microelectronic device of claim 13, wherein, within the horizontal area of street sub-region of the periphery circuitry region, the control circuitry structure further comprises:
a first data junction section comprising multiplexer (MUX) circuitry horizontally interposed between two of the data I/O and control sections in the first horizontal direction;
a second data junction section comprising additional MUX circuitry horizontally neighboring the CA section in the first horizontal direction;
a first voltage generator section comprising voltage generator circuitry neighboring one of the two of the data I/O and control sections in the first horizontal direction; and
a second voltage generator section comprising additional voltage generator circuitry neighboring the second data junction section in the first horizontal direction.

15. The microelectronic device of claim 14, wherein, within the horizontal area of street sub-region of the periphery circuitry region, the control circuitry structure further comprises:
an analog section interposed between the second data junction section and the second voltage generator section in the first horizontal direction and comprising one of more of analog temperature dispense circuitry, analog-to-digital conversion (ADC) devices, and digital-to-analog conversion (DAC) devices;
a capacitor section interposed between the analog section and the second voltage generator section in the first horizontal direction and comprising multiple capacitors; and
a fuse section interposed between the capacitor section and the second voltage generator section in the first horizontal direction neighboring and comprising anti-fuse circuitry.

16. The microelectronic device of claim 11, wherein, within the horizontal area of the additional street sub-region of the periphery circuitry region, the control circuitry structure comprises package interface sections each comprising package interface circuitry.

17. The microelectronic device of claim 11, wherein each of the bank regions comprises:
bank sub-regions; and
a throat region interposed in the first horizontal direction between a first group of the bank sub-regions and a second group of the bank sub-regions.

18. The microelectronic device of claim 17, wherein:
within a horizontal area of each of the bank sub-regions of each of the bank regions, the control circuitry structure comprises:
a transistor array section;
a row decoder section comprising row decoder circuitry neighboring the transistor array section in the second horizontal direction;
a column decoder section comprising column decoder circuitry neighboring the transistor array section and the row decoder section in the first horizontal direction; and
a bank logic section comprising bank logic circuitry neighboring the column decoder section in the first horizontal direction; and
within a horizontal area of the throat region of each of the bank regions, the control circuitry structure comprises control logic device sections each comprising digital signal acquisition (DSA) circuitry and error correction code (ECC) circuitry.

19. A memory device, comprising:
a periphery circuitry region comprising:
   a central sub-region; and
   at least two additional sub-regions horizontally extending from the central sub-region;
bank regions horizontally neighboring the periphery circuitry region;
a control circuitry structure comprising:
   relatively more speed-critical circuitry within a horizontal area of the periphery circuitry region; and
   relatively less speed-critical circuitry within horizontal areas of the bank regions; and
a memory array structure attached to and vertically below the control circuitry structure, the memory array structure comprising arrays of memory cells within the horizontal areas of the bank regions.

20. The memory device of claim 19, wherein the arrays of memory cells comprising arrays of dynamic random access memory (DRAM) cells.

* * * * *